(12) United States Patent
Sharma et al.

(10) Patent No.: US 12,273,907 B2
(45) Date of Patent: Apr. 8, 2025

(54) METHOD AND NETWORK ENTITY FOR LOGICAL CHANNEL MANAGEMENT IN A WIRELESS COMMUNICATION NETWORK

(71) Applicant: SAMSUNG ELECTRONICS CO., LTD., Suwon-si (KR)

(72) Inventors: Neha Sharma, Karnataka (IN); Aneesh Narendra Deshmukh, Karnataka (IN); Nayan Ostwal, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 598 days.

(21) Appl. No.: 17/450,492

(22) Filed: Oct. 11, 2021

(65) Prior Publication Data
US 2022/0086848 A1 Mar. 17, 2022

Related U.S. Application Data

(63) Continuation of application No. PCT/KR2021/012334, filed on Sep. 10, 2021.

(30) Foreign Application Priority Data

Sep. 11, 2020 (IN) .............................. 202041039454
Sep. 6, 2021 (IN) .............................. 202041039454

(51) Int. Cl.
*H04W 72/543* (2023.01)
*H04W 28/02* (2009.01)

(52) U.S. Cl.
CPC ..... *H04W 72/543* (2023.01); *H04W 28/0268* (2013.01)

(58) Field of Classification Search
CPC ............ H04L 47/722; H04W 28/0268; H04W 28/22; H04W 72/543; Y02D 30/70
See application file for complete search history.

(56) References Cited

U.S. PATENT DOCUMENTS 8,345,611 B2 * 1/2013 Park ........................ H04L 49/90
370/476
9,763,199 B2 * 9/2017 Pelletier ............ H04W 72/0473
(Continued)

FOREIGN PATENT DOCUMENTS

CA 3222049 A1 * 12/2022 ........ H04W 28/0252
CN 109983801 7/2019
(Continued)

OTHER PUBLICATIONS

Extended Search Report dated Dec. 13, 2023 in European Patent Application No. 21867158.4.
(Continued)

*Primary Examiner* — Eric Nowlin
(74) *Attorney, Agent, or Firm* — Nixon & Vanderhye, P.C.

(57) ABSTRACT

The method includes receiving, by a network entity, a plurality of data packets to be prioritized belonging to a Data Radio Bearer (DRB) from a network to a User Equipment (UE) using a plurality of logical channels and configuring a Quality of Service (QoS) parameter of the plurality of logical channels. Further, the method includes allocating, by the network entity, the configured QoS parameter to the DRB, logical channel, a Logical Channel Group (LCG), and a DRB buffer or queue. Further, the method includes dividing, by the network entity, the QoS parameter across one of the DRB, the logical channel, the LCG, and a DRB buffer or queue and sending, by the network entity, the plurality of data packets to the UE by allocating at least one resource as per the PBR and the BSD.

13 Claims, 11 Drawing Sheets

(56) References Cited

U.S. PATENT DOCUMENTS

| | | | |
|---|---|---|---|
| 9,973,438 B2* | 5/2018 | Johansson | H04L 47/621 |
| 10,136,360 B2* | 11/2018 | Paredes Cabrera ... | H04W 28/22 |
| 10,271,288 B2* | 4/2019 | Pelletier | H04W 52/343 |
| 10,542,499 B2* | 1/2020 | Pelletier | H04W 52/367 |
| 10,721,767 B2* | 7/2020 | Kim | H04W 76/19 |
| 11,166,189 B2* | 11/2021 | Xu | H04W 80/08 |
| 11,184,921 B2* | 11/2021 | Kim | H04W 74/02 |
| 11,290,961 B2* | 3/2022 | Pelletier | H04W 52/146 |
| 11,363,497 B2* | 6/2022 | Jeon | H04W 72/56 |
| 11,425,752 B2* | 8/2022 | Adjakple | H04W 72/1268 |
| 11,582,719 B2* | 2/2023 | Lin | H04W 28/0247 |
| 11,751,217 B2* | 9/2023 | Adjakple | H04W 72/54 370/329 |
| 11,765,615 B2* | 9/2023 | Jactat | H04W 88/14 370/229 |
| 11,930,500 B2* | 3/2024 | Lee | H04W 72/21 |
| 12,052,662 B2* | 7/2024 | Kung | H04W 92/18 |
| 2009/0104916 A1* | 4/2009 | Rosa | H04L 47/10 455/453 |
| 2010/0254480 A1* | 10/2010 | Park | H04L 49/90 375/295 |
| 2011/0130098 A1* | 6/2011 | Madan | H04W 24/02 455/63.1 |
| 2014/0286266 A1* | 9/2014 | Sammour | H04W 28/0252 370/329 |
| 2015/0215945 A1* | 7/2015 | Hsu | H04L 47/31 370/254 |
| 2016/0234714 A1 | 8/2016 | Basu Mallick et al. | |
| 2017/0013565 A1* | 1/2017 | Pelletier | H04W 52/146 |
| 2017/0164238 A1* | 6/2017 | Paredes Cabrera ... | H04W 28/22 |
| 2017/0257876 A1 | 9/2017 | Loehr et al. | |
| 2017/0318595 A1* | 11/2017 | Dinan | H04L 5/0053 |
| 2018/0014255 A1* | 1/2018 | Pelletier | H04W 72/0473 |
| 2018/0069618 A1 | 3/2018 | Loehr et al. | |
| 2018/0146398 A1 | 5/2018 | Kim et al. | |
| 2018/0220326 A1* | 8/2018 | Nagasaka | H04W 72/1268 |
| 2018/0288631 A1 | 10/2018 | Wei et al. | |
| 2019/0053260 A1* | 2/2019 | Shaheen | H04W 72/569 |
| 2019/0215863 A1* | 7/2019 | Kim | H04W 76/19 |
| 2019/0253978 A1* | 8/2019 | Pelletier | H04W 52/367 |
| 2019/0261408 A1* | 8/2019 | Lou | H04W 72/569 |
| 2020/0037345 A1* | 1/2020 | Ryoo | H04W 74/0833 |
| 2020/0053590 A1* | 2/2020 | Xu | H04W 28/0257 |
| 2020/0084655 A1* | 3/2020 | Fiorani | H04W 24/08 |
| 2020/0170035 A1 | 5/2020 | Lee et al. | |
| 2020/0187174 A1* | 6/2020 | Tang | H04L 5/0053 |
| 2020/0221344 A1* | 7/2020 | Jeon | H04W 28/0289 |
| 2020/0221468 A1 | 7/2020 | Babaei et al. | |
| 2020/0245257 A1* | 7/2020 | Pelletier | H04W 52/365 |
| 2020/0267753 A1* | 8/2020 | Adjakple | H04W 72/54 |
| 2020/0351938 A1* | 11/2020 | Kim | H04W 36/06 |
| 2021/0105743 A1* | 4/2021 | Lin | H04W 72/02 |
| 2021/0144580 A1 | 5/2021 | Alfarhan et al. | |
| 2021/0168854 A1* | 6/2021 | Kim | H04W 72/1268 |
| 2021/0360466 A1* | 11/2021 | Jactat | H04W 76/12 |
| 2022/0086848 A1* | 3/2022 | Sharma | H04L 47/722 |
| 2022/0272713 A1* | 8/2022 | Fan | H04L 47/215 |
| 2022/0287067 A1* | 9/2022 | Lee | H04W 72/569 |
| 2022/0330320 A1* | 10/2022 | Adjakple | H04W 72/1268 |
| 2023/0362946 A1* | 11/2023 | Adjakple | H04W 72/54 |
| 2024/0259863 A1* | 8/2024 | He | H04W 72/0453 |

FOREIGN PATENT DOCUMENTS

| | | | | |
|---|---|---|---|---|
| CN | 108738080 B | * | 6/2020 | H04L 47/215 |
| CN | 117397303 A | * | 1/2024 | H04W 28/0252 |
| EP | 3162114 B1 | * | 8/2018 | H04L 69/22 |
| EP | 3 369 277 | | 9/2018 | |
| EP | 3369277 B1 | * | 8/2022 | H04W 72/042 |
| EP | 3721667 B1 | * | 11/2023 | H04B 7/06964 |
| EP | 4304286 A2 | * | 1/2024 | H04B 7/06964 |
| KR | 10-2016-0062101 | | 6/2016 | |
| KR | 10-2016-0114685 | | 10/2016 | |
| KR | 10-2017-0110069 | | 10/2017 | |
| WO | WO-2009038363 A2 | * | 3/2009 | H04L 1/0084 |
| WO | WO-2009040395 A1 | * | 4/2009 | H04L 47/10 |
| WO | 2017/072410 | | 5/2017 | |
| WO | WO-2017072410 A1 | * | 5/2017 | H04W 72/042 |
| WO | 2017/092457 | | 6/2017 | |
| WO | WO-2018075828 A1 | * | 4/2018 | H04W 72/02 |
| WO | WO-2018192560 A1 | * | 10/2018 | H04L 47/215 |
| WO | 2019/017707 | | 1/2019 | |
| WO | 2019/032734 | | 2/2019 | |
| WO | WO-2019139384 A1 | * | 7/2019 | H04B 7/06964 |
| WO | WO-2019184685 A1 | * | 10/2019 | H04W 28/0263 |
| WO | 2019/217530 | | 11/2019 | |
| WO | 2019/242603 | | 12/2019 | |
| WO | WO-2020116820 A1 | * | 6/2020 | H04W 28/0278 |
| WO | WO-2022055293 A1 | * | 3/2022 | H04L 47/722 |
| WO | WO-2022252188 A1 | * | 12/2022 | H04W 28/0252 |

OTHER PUBLICATIONS

Examination Report dated May 23, 2022 in Indian Patent Application No. 202041039454 and English-language translation.

International Search Report and Written Opinion dated Dec. 8, 2021 in corresponding International Application No. PCT/KR2021/012334.

* cited by examiner

Layer-2 Structure

Transport block

METHOD AND NETWORK ENTITY FOR LOGICAL CHANNEL MANAGEMENT IN A WIRELESS COMMUNICATION NETWORK

CROSS-REFERENCE TO RELATED APPLICATIONS

This application is a continuation of International Application No. PCT/KR2021/012334 designating the United States, filed on Sep. 10, 2021, in the Korean Intellectual Property Receiving Office and claiming priority to Indian Provisional Patent Application No. 202041039454, filed on Sep. 11, 2020 in the Indian Patent Office and Indian Non-Provisional Patent Application No. 202041039454, filed on Sep. 6, 2021, in the Indian Patent Office, the disclosures of which are incorporated by reference herein in their entireties.

BACKGROUND

Field

The disclosure relates to a wireless communication network. For example, the disclosure relates to method and network entity for logical channel management in the wireless network.

Description of Related Art

In general, several broadband wireless technologies have been developed in recent years to provide enhanced applications and services to meet rising needs of broadband users. A Second Generation (2G) wireless communication system has been created to deliver voice services while ensuring mobility of the users. A Third-Generation (3G) wireless communication system provides both voice and data services. A Fourth-Generation (4G) wireless communication system has been developed in recent years to provide high-speed data delivery. However, the fourth-generation wireless communication system still lacks resources needed to fulfill the rising needs for high-speed data services. This problem is addressed by deployment of a Fifth-Generation (5G) wireless communication system to meet the rising needs for high-speed data services. Furthermore, the fifth-generation wireless communication system provides ultra-reliability and supports low latency applications.

For the next generation of the wireless communication system (e.g. 6G), various technologies have been considered, such as Visible Light Communication (VLC), Terahertz (THz) band e.g., frequencies from 100 GHz to 3 THz, Infrared wave, and Ultraviolet wave. Among all these technologies, the THz band is envisioned as a potential technology for a broad variety of applications at Nano/Micro/Macro sizes. The THz band has several advantages, including an ability to offer Terabits per second (Tbps) data speeds, reliable transmission, and low latency. Because of a large variety of unused and undiscovered spectrum, frequencies ranging from 100 GHz to 3 THz are potential bands for the next generation of wireless communication systems. The THz band has the potential for revolutionary applications in the realms of devices, circuits, software, signal processing, and systems. Further, the THz band/mm Wave's cellular networks provide ultra-high data rates for super-fast download speeds for computer communication, autonomous vehicles, robotic controls, information shower, high-definition holographic gaming, entertainment, video conferencing, and high-speed wireless data distribution in data centers.

Extremely high data rates provide promising applications for future mmWaves and THz bands, which are expected to emerge in 6G networks and beyond. The extremely high data rates/peak data rate in the Gigabits per second (Gbps) range is conceivable with the THz bands and high mmWaves. Furthermore, the peak data rate throughput may potentially exceed 100 Gbps in future wireless communication systems/beyond 5G. Furthermore, additional needs are required in the future wireless communication systems/beyond 5G, such as decreased Transmission Time Interval (TTI) boundaries or large packet sizes, are required to enable greater data throughput post a challenge to strengthen data path protocol design for in the future wireless communication systems/beyond 5G.

Existing Fifth-Generation New Radio (5G-NR) wireless communications system may handle peak cell throughputs in the tens of Gbps range, with per-user peak data rates in a couple of Gbps range. With advancements in radio access technology and exploration of higher bandwidths beyond 100 GHz, a demand for peak per-user data rate throughput in the future wireless communication systems/beyond 5G may easily exceed 100 Gbps. A subcarrier spacing is increased and the TTI time is reduced, to be supported, to a few microseconds to a few hundred nanoseconds for channel characteristics of the THz bands. Furthermore, advancements in higher-level protocols may necessitate large packet sizes to enable such high data throughput/extremely high data rates. With such higher data throughput and/or lower TTI boundaries and/or jumbo packet sizes, a modem protocol architecture must be strengthened to sustain and support these new needs for the future wireless communication systems/beyond 5G. Thus there is a need for various method(s) by which a protocol design can be changed to support the new requirements (e.g. higher data throughput and/or lower TTI boundaries and/or jumbo packet sizes) of the future wireless communication systems/beyond 5G.

In addition, existing multi-core processors are capable of supporting the new requirements (NR data throughput requirements). For an NR mobile device (10), a standard quad-core system (equipped with a few Hardware Accelerators (HWA) such as a ciphering engine, a header parser, etc.) is utilized. The NR mobile device (10), the standard quad-core system can support a couple of Gbps Transmission Control Protocol (TCP) applications on a modem protocol stack including data plane processing units like a Packet Data Convergence Protocol (PDCP) 10A1, a Radio Link Control (RLC) 10A3 and a Medium Access Control (MAC) 10A4, as illustrated in FIG. 1A.

In addition, existing CPU utilization data indicates that this is typically the bottleneck for the high data throughput. For high data throughput, the NR mobile device (10) uses a functional decomposition or a data decomposition. The functional decomposition is a mechanism for breaking down a given function or task into smaller tasks that are done one after the other. The data decomposition involves tasks that are parallelized. Because of interdependency between the multiple packets/task in the same flow in the existing mechanism (e.g. functional/data decomposition) in the existing modem protocol architecture have a limited scope for parallelization. The interdependency is usually referred to as critical sections as concurrent access for an update of any of the variables belonging to this section needs to be protected. For example, in a Radio Link Control Layer of the Receiver (RLC-RX), there are multiple critical sections like window management, segment reassembly, etc. Further, overheads of the critical sections in such parallel architecture reduce an overall efficiency of the existing multi-core processors. Thus there is a need for reducing the critical sections for efficient parallelization utilizing for full capability of the existing multi-core processors/NR mobile device (10).

In addition, each core's capability is fully utilized with a minimal overhead of switching the tasks running on that core, and inter-core dependency (e.g. critical sections) is minimized and/or reduced or completely removed while ensuring a balanced distribution of workload across the cores for an efficient implementation on the existing multi-core processors. A data plane protocol architecture should account for these issues to achieve the aforementioned efficient implementation on the existing multi-core processors. The Functional decomposition within a layer leads to some overhead as the RLC functionalities can't be equally distributed among different tasks across multiple multi-core processors to make it truly and equally parallel with no critical section(s) and the functional decomposition is not inherently scalable. The data decomposition of a single RLC flow, through scalable, can also lead to lots of overhead in managing a common RLC window and handling RLC procedures when parallelizing one RLC flow over multiple processing cores. Thus there is a need for various method(s) for parallelizing RLC with the data decomposition to achieve enormously high data throughput.

In addition, any presence of the critical sections limits the scaling of the parallel implementation because of a decrease in efficiency due to the overhead(s). In some of the existing method(s), there is no functional decomposition of any functional layer in the modem protocol stack (pertaining to the data path functionality) and some of the existing method(s) try to check for variants for the data decomposition. However, it doesn't restrict the existing systems to be purely a data decomposition model nor does it restrict the solution to have a combination of the functional decomposition and data decomposition. Thus, it is desired to provide a useful alternative to support the new requirements with efficient parallelization utilizing in the future wireless communication systems/beyond 5G.

SUMMARY

Embodiments of the disclosure provide a method and network entity for designing a Logical Channel Priority (LCP) and/or resource allocation mechanism for a 6G and/or 5G system and/or beyond 5G system to achieve high throughput/data rates. In addition, the method offers parallelization for various flows of data plane over several processor cores to achieve high throughput/data rate in the 6G and/or 5G system and/or beyond the 5G system.

Embodiments of the disclosure provide a resource allocation at radio bearer level (DRB) or Logical channel group (LCG) or per bearer buffer or bearer queue for resource selection rather than at a logical channel level.

Embodiments of the disclosure provide a configuration of LCP or resources selection parameters for multiple sub-flows like a Prioritized Bit Rate (PBR), a Bucket Size Duration (BSD) can be per bearer buffer or bearer queue or radio bearer per LCG or sub-flow (distribution among multiple flows of data plane).

Embodiments of the disclosure provide a new design for the allocation of resources to achieve the high throughput/data rate in the 6G and/or 5G system and/or beyond the 5G system. Where all the bearers or LCG or bearer buffer are allocated resources in a decreasing priority order up to corresponding PBR, resources have been allocated to multiple Logical Channels (LCs) under the same bearer or LCG or bearer queue or buffer, and if any resources remain, all the bearers or LCG or bearer buffer served in strict decreasing priority order until either the data for that bearer or a UL grant is exhausted, whichever comes first. Where the selection of the LC for the allocation of resources depends upon a distribution scheme at a PDCP.

Embodiments of the disclosure allocate, by a MAC entity, the resources first to the LC which is carrying a control plane, and then allocate the resources to LC which is carrying data. Furthermore, the MAC entity first allocates the resources to the LC which is a primary LC then should allocate the resources to other secondary LCs under the same bearer.

A method, according to various example embodiments, for providing resource allocation in a wireless network is provided. The method includes: receiving, by a network entity, a plurality of data packets to be prioritized belonging to a Data Radio Bearer (DRB) from a network to a User Equipment (UE) using a plurality of logical channels. Further, the method includes configuring, by the network entity, a Quality of Service (QoS) parameter, wherein the QoS parameter comprises a priority, a Prioritized Bit Rate (PBR), and a Bucket Size Duration (BSD). Further, the method includes allocating, by the network entity, the configured QoS parameter to the DRB, logical channel, a Logical Channel Group (LCG), and a DRB buffer or queue. Further, the method includes dividing, by the network entity, the QoS parameter across one of the DRB, the logical channel, the LCG, and a DRB buffer or queue. Further, the method includes sending, by the network entity, the plurality of data packets to the UE by allocating at least one resource as per the PBR and the BSD.

In an example embodiment, the QoS parameter is configured by performing, by the network entity, one of configuring the PBR and the BSD based on the DRB or configuring the PBR and the BSD based on the LCG or configuring the PBR and the BSD based on the DRB buffer or queue or configuring the PBR and the BSD based on the logical channel.

In an example embodiment, the configuring the PBR and the BSD based on the DRB includes detecting, by the network entity, that the DRB with a logic channel and configuring, by the network entity, a value of the PBR, the BSD, and the UE parameter for each DRB, where each DRB comprises the plurality of logical channels.

In an example embodiment, the configuring the PBR and the BSD based on the LCG includes detecting, by the network entity, that the DRB have multiple logic channel, where the multiple logic channel belongs to a single LCG and configuring, by the network entity, a value of the PBR, the BSD, and the UE parameter for each LCG, where each LCG comprises the plurality of logical channels, where each LCG comprises a unique Identity (ID).

In an example embodiment, the configuring the PBR and the BSD based on the DRB buffer or queue includes configuring, by the network entity, a value of the PBR, the BSD, and the UE parameter for each DRB buffer or queue, where each MAC entity of the network entity maintains the DRB buffer or queue and stores data of the DRB buffer or queue from different logical channel under same DRB bearer or IP flow In an example embodiment, resource allocation directly runs on the DRB buffer or queue, and size of the DRB buffer or queue depends on a transmitting window of RLC and is based on the PBR and the BSD.

In an example embodiment, the configuring the PBR and the BSD based on the logical channel includes detecting, by the network entity, that multiple logic channels under the same DRB and configuring, by the network entity, a value of the PBR, the BSD, and the UE parameter for each logical channel of the plurality of logical channels.

In an example embodiment, the QoS parameter is configured through one of a Radio Resource Control (RRC) message and a layer-2 message.

In an example embodiment, allocating, by the network entity, the configured QoS parameter to the DRB includes distributing, by the network entity or the UE, the value of the PBR and the BSD among multiple logic channels based on a PDCP distribution, where the network entity is configured the PDCP distribution in a Radio Resource Control (RRC) message.

In an example embodiment, the PDCP distribution comprises a sequential distribution or a random distribution, a block distribution or a batch distribution, and a split threshold-based distribution.

In an example embodiment, the sequential distribution or the random distribution includes assigning, by the network entity, a PDCP-Protocol Data Unit (PDU) to a sub-flow of a Radio link control (RLC) in a round-robin manner and mapping, by the network entity, the PDCP-PDU to the sub-flow of the RLC.

In an example embodiment, the block distribution or the batch distribution includes one of mapping, by the network entity and/or the UE, a batch of sequential PDCP-PDUs to one sub-flow of the RLC; mapping, by the network entity and/or the UE, the PDCP-PDUs with least buffer occupancy; mapping, by the network entity and/or the UE, the PDCP-PDUs based on a processing capability of the UE; and mapping, by the network entity and/or the UE, the PDCP-PDUs based on a number of transmissions of the plurality of data packets.

In an example embodiment, distributing, by the network entity or the UE, the value of the PBR and the BSD among multiple logic channels based on the PDCP distribution includes determining, by the network entity, whether the PDCP distribution is the sequential distribution or the block distribution and performing, by the network entity, one of: equally distributing the value of the PBR to each logical channel of the plurality of logical channels in response to determining that the PDCP distribution is the sequential distribution or the block distribution; and distributing the value of the PBR to each logical channel of the plurality of logical channels based on an uplink split threshold value in response to determining that the PDCP distribution is not the sequential distribution or the block distribution, where the uplink split threshold configured by the network entity or based on the capability of the UE.

In an example embodiment, distributing, the value of the PBR to each logical channel of the plurality of logical channels based on the uplink split threshold value includes configuring, by the network entity, the uplink split threshold, determining, by the network entity, whether data available for transmission is greater than or equal to the uplink split threshold and performing, by the network entity, one of: mapping PDCP-PDUs to a primary logical channel of the plurality of logical channels in response to determining that the data available for transmission is greater than or equal to the uplink split threshold; and mapping PDCP-PDUs to a-second logical channel of the plurality of logical channels in response to determining that the data available for transmission is not greater than or equal to the uplink split threshold.

In an example embodiment, the method includes sending, by the network entity, a resource to the UE, where the UE sends a transport block using scheduling to inform a Modulation and Coding Scheme (MCS), no of resource blocks through which the UE determines size of the transport block.

In an example embodiment, the method includes receiving, by the UE, the resource from the network entity. Further, the method includes allocating, by the UE, the received resource to one of the DRB, the logical channel, the LCG, and the DRB buffer, where the resource is allocated in decreasing priority order up to corresponding the PBR and the resource is allocated based on the PDCP distribution. Further, the method includes determining, by the UE, whether the PDCP distribution is the sequential distribution. Further, the method includes performing, by the UE, one of: selecting data PDU from each logical channel until the PBR limit is reached in response to determining that the PDCP distribution is the sequential distribution; and selecting data PDU in batches from each logical channel until the PBR limit is reached in response to determining that the PDCP distribution is nor the sequential distribution. Further, the method includes detecting, by the UE that the data PDU is pending in a logical channel. Further, the method includes detecting, by the UE, that the detected data PDU in strict decreasing priority order. Further, the method includes allocating, by the UE, pending resources to all the DRB or LCG or bearer queues until either the data PDU for that DRB or a UL grant is exhausted for that DRB.

Accordingly, various example embodiments herein provide the network entity in the wireless network. The network entity includes: a logical channel controller coupled with a processor and a memory. The logical channel controller is configured to: receive a plurality of data packets to be prioritized belonging to the DRB from a network to the UE using the plurality of logical channels. Further, the logical channel controller is configured to set a quality of service (QoS) parameter, where the QoS parameter comprises the priority, a prioritize bit rate (PBR), and a bucket size duration (BSD). Further, the logical channel controller is configured to allocate the configured QoS parameter to a data radio bearer (DRB), the logical channel, a logical channel group (LCG), and the DRB buffer or queue. Further, the logical channel controller is configured to divide the QoS parameter across one of the DRB, the logical channel, the LCG, and the DRB buffer or queue. Further, the logical channel controller is configured to send the plurality of data packets to user equipment (UE) by allocating at least one resource as per the PBR and the BSD.

Accordingly, various example embodiments herein provide the UE in the wireless network. The network entity includes a logical channel controller coupled with a processor and a memory. The logical channel controller is configured to receive the resource(s) from the network entity. Further, the logical channel controller is configured to allocate the received resource(s) to one of the DRB, the logical channel, the LCG, and the DRB buffer, where the resource(s) is allocated in decreasing priority order up to corresponding the PBR and the resource(s) is allocated based on the PDCP distribution. Further, the logical channel controller is configured to determine whether the PDCP distribution is the sequential distribution. Further, the logical channel controller is configured to select data PDU from each logical channel until the PBR limit is reached in response to determining that the PDCP distribution is the sequential distribution. Further, the logical channel controller is configured to select data PDU in batches from each logical channel until the PBR limit is reached in response to determining that the PDCP distribution is not the sequential distribution. Further, the logical channel controller is configured to detect that the data PDU is pending in the logical channel. Further, the logical channel controller is configured to detect that the detected data PDU is in strict decreasing priority order. Further, the logical channel controller is configured to allocate pending resources to all the DRB or LCG or bearer queues until either the data PDU for that DRB or a UL grant is exhausted for that DRB.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the example embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The example embodiments herein and the various features and details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the example embodiments presented herein are not limited by the accompanying drawings. As such, the present disclosure should be construed to extend to any alterations, equivalents and substitutes in addition to those which are particularly set out in the accompanying drawings.

Throughout this disclosure, the terms "logical channel", "LCH' and "LC" may be used interchangeably. Throughout this disclosure, the terms "logical channels" and "LCs" may be used interchangeably.

Figure 1A:
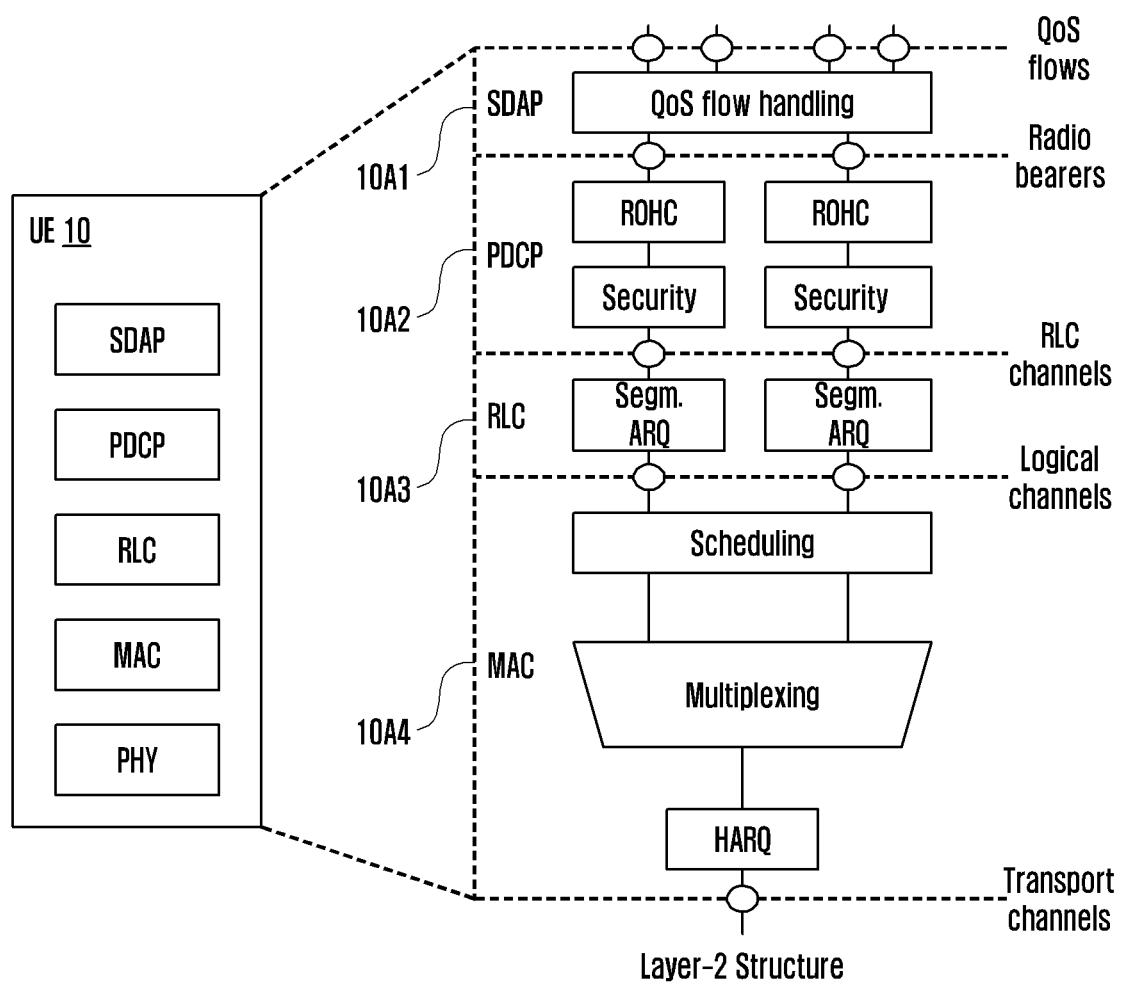
FIG. 1A is a diagram illustrating a functionality overview for data plane which includes processing at layers related to data plane processing, according to the prior art.

FIG. 1A is a diagram illustrating a functionality overview for the data plane which includes processing at layers related to data plane processing, according to the prior art.

A typical modem communication protocol design system that involves the processing of layers (e.g. 10A1-10A4), of a UE (10), related to data plane processing such as Service Data Adaptation Protocol (SDAP) layer (10A1), Packet Data Convergence Protocol (PDCP) layer (10A2), Radio Link Control (RLC) layer (10A3), and Medium Access Control (MAC) layer (10A4). The SDAP Layer (10A1) is involved with mapping between Quality of Service (QoS) Flow and Data Radio Bearer (DRB). The PDCP layer (10A2) deals with security, Robust Header Compression (ROHC), and Split Bearer. The RLC layer (10A3) deals with Automatic Repeat reQuest (ARQ) and Segmentation. The MAC layer (10A4) deals with scheduling, concatenation, and Hybrid Automatic Repeat reQuest (HARQ).

Figure 1B:
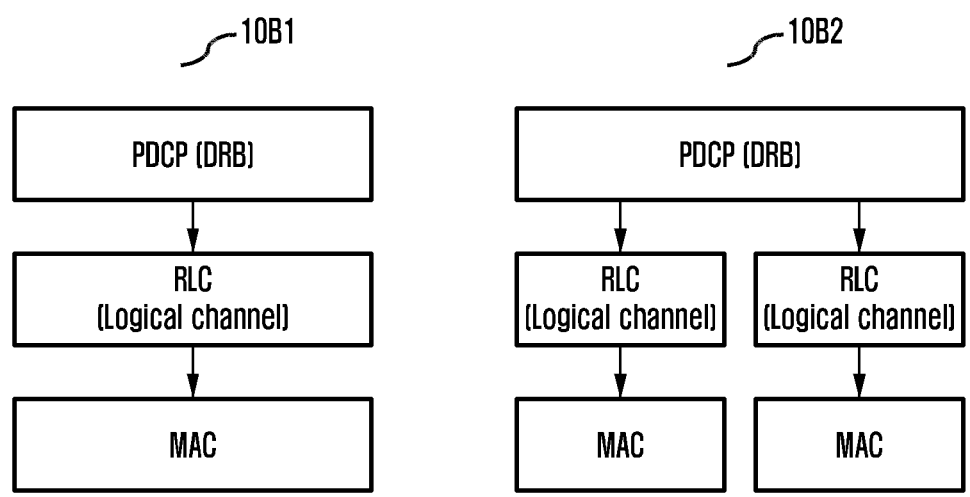
FIG. 1B is a diagram illustrating an issue with existing Logical Channel Prioritization (LCP) procedure, according to the prior art.

FIG. 1B is a diagram illustrating an issue with an existing Logical Channel Prioritization (LCP) procedure, according to the prior art;

According to specification TS 38.321, uses the Logical Channel Prioritization (LCP) method whenever a new transmission is performed. RRC manages uplink data scheduling by signaling for each logical channel per MAC entity:
a. Priority: An increasing priority value indicates a lower priority level, whereas a decreasing priority value indicates a higher priority level, priority of each logical channel.
b. Prioritized Bit Rate (PBR): This defines the average bit rate for each Logical Channel (LC) which the UE (10) should be able to fulfill to meet the provisioned QoS defined for each LC. The PBR is the data rate provided to one LC before allocating any resource to a lower-priority LC.
c. Bucket Size Duration (BSD): This defines the upper time limit for continuous accumulation of data for each LC. This parameter is used to avoid starvation for lower priority LC. The BSD is used to set the maximum amount of pending data allowed for an LC. For an LCID the bucket size=BSD×PBR (both are in MAC_config struct) is the maximum UL data an LCID can buffer.
d. UE variable (Bj) for the LCP: Bj is maintained for each LC. The MAC entity shall initialize Bj of the LC to zero when the LC is established. For each LCj, the MAC entity:
  i. Increment Bj by the product PBR×T before every instance of the LCP procedure, where T is the time elapsed since Bj was last incremented;
  ii. If the value of Bj is greater than the bucket size (e.g. PBR×BSD) then set Bj to the bucket size.

Each DRB has one LC (10B1). Each LC is associated with the LCP parameters (e.g. PBR, BSD, etc.) that are required to meet a QoS requirement(s). An issue with the existing LCP procedure: In the prior art there are two scenarios where radio bearer (e.g. DRB) can have multiple LC,
  a. Split bearer scenario (10B2) where one DRB has two LCs. In this scenario, these LCs mapped to different MAC entities. In this case, the PBR value can be the same or separate depending on an uplink split threshold. Each Link has a minimum PBR value that is equivalent to bearer QoS requirements. A network may set the same value for the PBR or may set the high value of PBR which is of primary transmitting link.
  b. PDCP duplication scenario where one DRB can have more than two LCs. In this case, there will be a single MAC entity but the logical channel can be mapped to a different carrier. The PBR and other parameters have been the same for both the LCs and new rules which are based on restriction of selection of LC have been defined. There is no issue in LCP in case a single DRB is mapped to multiple LCs and the same MAC entity due to different grants from different carriers.

An issue with the existing configuration of the LCP parameters values: the existing mechanism configures the LCP parameters (e.g. PBR, BSD) per LC so that the LCP parameters can fulfill the QoS requirements when DRB is served through more than one LC during split bearer or PDCP duplication. In the existing mechanism packets shared with MAC is always sequential in uplink under the same link. One possible option is to use reuse the existing mechanism for new architecture e.g. network configures the LCP parameters values for each LC as per the QoS requirement of the bearer. In this case, each LC will be allocated with the PBR which is equivalent to the QoS of the bearers. This will lead to starvation of other LCs of lower priority as each LC (under the same DRB) will be allocated the resources as per the PBR and have the same priority.
  a. If the data is distributed sequentially to each LC, then if the user reuses the existing LCP mechanism which may lead to high reordering issues on the receiver side at gNB as the UE (10) first allocates the resources as per the PBR.
  b. Another possible cause is distribution mechanism can be based on batch processing for each LC. If the distribution of packets is perfectly aligned with resource allocation then there may not be an issue as an assumption here is whatever packet PDCP is giving in each TTI to each LC, it will immediately be sent to the network which may again lead to reordering issues. There is a need to define a new mechanism where the UE (10) should select the next LC based on distribution/selection in previous TTI else it can lead to reordering issues.

Another aspect could be if the distribution mechanism is based on a threshold set by the network for each LC. In this case, the upper layer distributes the packets to other LC when it crosses the threshold. The UE (10) starts using the second or more LC when the data rate crosses the thresholds. In this case, the MAC entity or cell or carrier can be the same, the MAC entity may first allocate the resources to LCs under the same DRB. This case is different from the existing mechanism as there in such cases different MAC entities handle such situations, which may lead to starvation for other LCs of lower priority.

In case the user reuses the existing mechanism to allocate the LCP related parameters for each LC then it may lead to a high reordering issue and starvation for other LCs of lower priority if each LCH within the same DRB has the same PRB value. Due to the mapping of a single bearer to multiple LCs, the same mechanism cannot be reused as the PBR can become very high per bearer and it may cause an issue to other configured bearers which are of low priority. The same issue can exist if LCP or any other similar procedure is used to assigned or allocate resources to different services at any other layer.

Figure 1C:
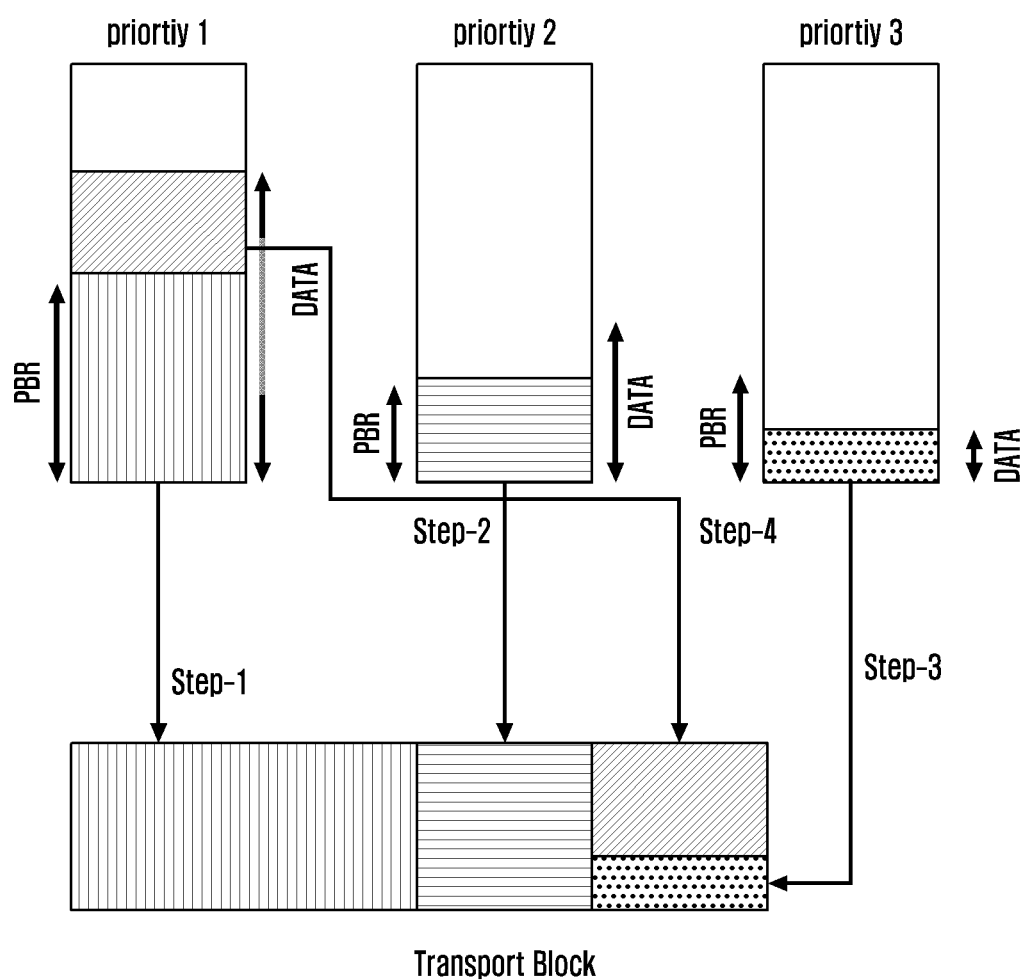
FIG. 1C is a diagram illustrating an example scenario in which a User Equipment (UE) allocates resources to logical channels, according to the prior art.

FIG. 1C is a diagram illustrating an example scenario in which the UE (10) allocates resources to logical channels, according to the prior art.

As per 3GPP 38.300, the UE (10) has an uplink rate control function that manages the sharing of uplink resources between LCs. RRC controls the uplink rate control function by giving each LC's priority, PBR, and BSD. The values of the PBR and BSD signaled need not be related to the ones signaled via NG to the gNB.

Impact on the LCP method due to multiple LC under same bearer or IP flow: The uplink rate control function ensures that the UE (10) serves the LCs in the following sequence:
  a. All relevant LCs are allocated resources in a decreasing priority order up to the corresponding PBR value;
  b. If any resources remain, all the LCs are served in strict decreasing priority order until either the data for that LC or the UL grant is exhausted, whichever comes first.
    iii. All relevant LCs in decreasing priority order up to corresponding PBR value;
    iv. All relevant LCs in the decreasing priority order for the remaining resources assigned by the grant.

If more than one LC has the same priority, the UE (10) may serve them equally. The FIG. 1C denotes LC 1, 2, 3 with their designated priorities. The PBR is allocated and as per their priority in case there are any more resources left then they are also allocated as per the priority (steps/operations "1", "2" and "3" perform first then step/operation "4"). In this case, the UE allocates the resources based on the priority of logical channel and PRB. The UE selects the logical channel with priority 1 as shown in step-1 and select the data up to PRB. Then UE will select the data for priority channel 2, at step-2 it will again select the data up to PRB or the amount of data available which is less than PRB. If resources are still left, it will check the logical channel with priority 3, at step-3 and select the data which can be sent to the network. Once UE performs the selection for all the logical channels up to PRB, if it has still resources then again will start with the logical channel with high priority as shown in step-4.

Consider a case where there are multiple LCs under the same DRB with the same priority. There is no existing mechanism in the prior art that defines how to select the LCH with the same priority. In the existing mechanism, there can be LC with the same priority but in a newly proposed mechanism where the same DRB can have multiple LCH with the same priority, there is a need to define a procedure for the selection of LC. There is a need to define a mechanism where the UE (10) should select the LC based on distribution or allocation in previous TTI.

As per 3GPP 38.300, there is a single LC per DRB and each LC received packet is in the sequence. In the proposed scheme multiple LC can receive the packets under different distribution mechanisms which cannot be in sequence. If the existing mechanism is reused, the UE (10) may end up sending the out-of-order packets and can cause reordering delay. To avoid reordering issues, the UE (10) has to ensure that selection of LC aligns with the distribution mechanism. There is a need to define a mechanism under which have to allocate resources under the same DRB for multiple LCs serving through the same carrier or multiple carriers. To support high data rates existing mechanism may not be sufficient and a new mechanism needs to be defined. There is a need to redesign the LCP as well as allocation of parameters associated with the LCP procedure.

Accordingly, various example embodiments provide a method for logical channel management in a wireless network. The method includes receiving, by a network entity, a plurality of data packets to be prioritized belonging to a Data Radio Bearer (DRB) from a network to a User Equipment (UE) using a plurality of logical channels. Further, the method includes configuring, by the network entity, a Quality of Service (QoS) parameter, where the QoS parameter comprises a priority, a Prioritized Bit Rate (PBR), a Bucket Size Duration (BSD), and a UE parameter (Bj). Further, the method includes allocating, by the network entity, the configured QoS parameter to the DRB. Further, the method includes dividing, by the network entity, the QoS parameter across one of a DRB, a logical channel, a Logical Channel Group (LCG), and a DRB buffer or queue. Further, the method includes sending, by the network entity, the plurality of data packets as per the PBR.

Accordingly, various example embodiments herein provide the network entity for resource allocation in the wireless network. The network entity includes a logical channel controller coupled with a processor and a memory. The logical channel controller is configured to receive the plurality of data packets to be prioritized belonging to the DRB from a network to the UE using the plurality of logical channels. Further, the logical channel controller is configured to set the QoS parameter, where the QoS parameter comprises the priority, the PBR, and the BSD. Further, the logical channel controller is configured to allocate the configured QoS parameter to the DRB, the logical channel, the LCG, and the DRB buffer or queue. Further, the logical channel controller is configured to divide the QoS parameter across one of the DRB, the logical channel, the LCG, and the DRB buffer or queue. Further, the logical channel controller is configured to send the plurality of data packets to the UE by at least one resource as per the PBR and the BSD.

Accordingly, various example embodiments herein provide the UE for resource allocation in the wireless network. The network entity includes a logical channel controller coupled with a processor and a memory. The logical channel controller is configured to receive the resource(s) from the network entity. Further, the logical channel controller is configured to allocate the received resource(s) to one of the DRB, the logical channel, the LCG, and the DRB buffer, where the resource(s) is allocated in decreasing priority order up to corresponding the PBR and the resource(s) is allocated based on the PDCP distribution. Further, the logical channel controller is configured to determine whether the PDCP distribution is the sequential distribution. Further, the logical channel controller is configured to select data PDU from each logical channel until the PBR limit is reached in response to determining that the PDCP distribution is the sequential distribution. Further, the logical channel controller is configured to select data PDU in batches from each logical channel until the PBR limit is reached in response to determining that the PDCP distribution is not the sequential distribution. Further, the logical channel controller is configured to detect that the data PDU is pending in the logical channel. Further, the logical channel controller is configured to detect that the detected data PDU is in strict decreasing priority order. Further, the logical channel controller is configured to allocate pending resources to all the DRB or LCG or bearer queues until either the data PDU for that DRB or a UL grant is exhausted for that DRB.

Accordingly, various example embodiments provide a design of logical channel prioritization procedure or resource allocation or selection of bearers or application for sending data for 6th Generation (6G) system. A proposed method, network entity, and UE for enhancing Logical channel prioritization (LCP) for high-speed data throughput for 5G system or beyond 5G systems including future 6G and subsequent generations of wireless systems. Further, the method includes addressing the implementation and specification changes required for a typical modem transmitter and receiver design for processing the data related to a communication protocol. Further, the method includes an implementation for a high throughput modem protocol system. Further, the method includes a flexible design with an optimal number of cores to support the high throughput requirement without compromising performance of the network entity and the UE.

Further, a method according to various example embodiments deals with the field of a mobile communication protocol. According to various embodiments, the example method may list down all the possible variants for the LCP or any other resource allocation methods which can be utilized for very high data throughput. The example method may address the implementation and specification change required for a typical modem transmitter (TX) and receiver (RX) design for processing data related to a communication protocol and suggests modifications to existing design (e.g. 2G system, 3G system, 4G system, etc.) and specification to ease the implementation for a high throughput modem protocol system. The various example embodiments have a flexible design with the optimal number of cores to support the high throughput requirement without compromising for the performance and is directed for a future communication protocol specification that has huge data required for processing.

In an example method, the core functionality is considered to be based upon the 3rd Generation Partnership Project (3GPP 5G) New Radio specifications but this should be treated for illustration purposes only. For a data plane packet, all the packets go through the data plane layers one after another in a sequential manner. Further, there are no restrictions on following the New Radio (NR) specification precisely but expecting basic services to the layers above and below. However, the example method does not restrict the ideology to be related to only the layered architecture as per NR. In spirit, if any future protocol system having a different layered architecture, the concepts of LCP for parallelizing multiple sub-flows still are valid in principle. The protocol layers from NR specification along with their functionalities are mentioned only for indicative purposes. However, the proposed method does not intend to restrict any further simplifications and optimizations to the current NR specification.

Referring now to the drawings and more particularly to FIGS. 2, 3, 4A, 4B, 5A, 5B, 6 and 7, where similar reference characters denote corresponding features throughout the figures, there are shown various example embodiments.

Figure 2:
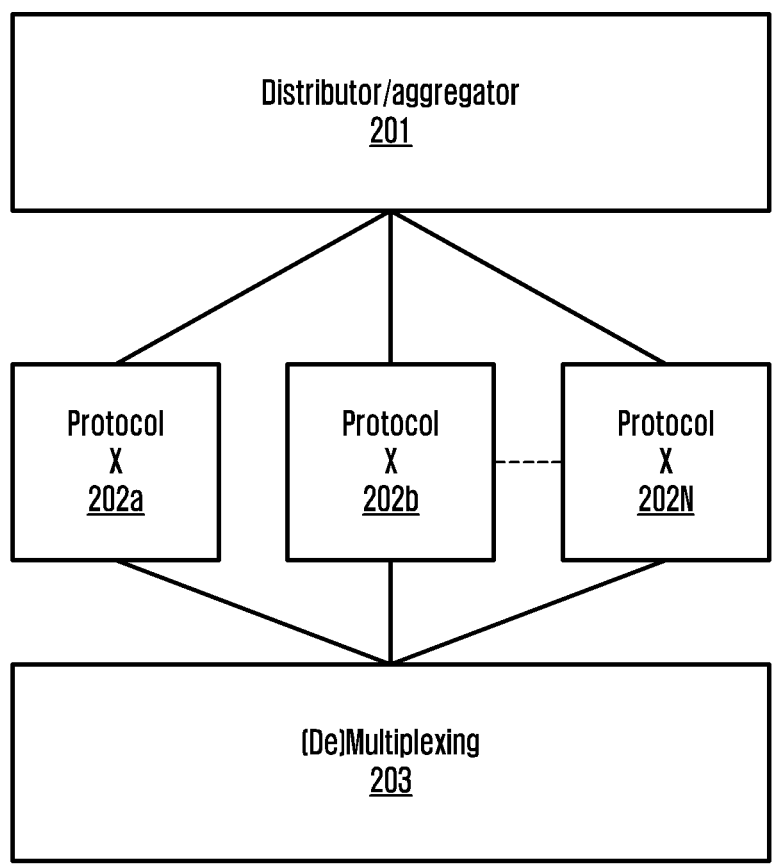
FIG. 2 is a flow diagram illustrating parallelization of data packet processing per radio bearer flow or IP flow or logical channel flow or physical channel flow or transport channel flow, according to various embodiments.

FIG. 2 is a flow diagram illustrating parallelization of data packet processing per radio bearer flow or IP flow or logical channel flow or physical channel flow or transport channel flow, according to various embodiments.

Referring to FIG. 2, an example method to achieve high data rates is illustrated. The functionality of the distributor further comprises distribution of data packets from the incoming said radio flow or IP flow to one or more multiple sub-flows as shown in FIG. 2. A distributor/an aggregator module (201) can be based on any of NR module which can be the SDAP or the PDCP or the RLC or the MAC or the physical layer (PHY) or any other new module or IP flow or TCP module which can be based on the 5G system or 6G system or any other next-generation technology. The functionality of the distributor (201) further comprises distribution of data packets based on one of the methods like sequential, random, block, load-based processing capability-based logic, heuristic-based approach, or a combination of any of these schemes described.

The distributor (201) provides the data packets to different sub-flows which can be based on any existing module or protocol or new module or protocol (202a, 202b ... 202N). The aggregator (201) functionality further comprises of aggregator of receiving the data from different protocol sub-flow. These multiple sub-flows can be mapped to single or multiple component carriers on any existing module or protocol or new module or protocol. The multiplexing or de-multiplexing entity (203) is responsible for the assembly or de-assembly of packets from different sub-flows.

Figure 3:
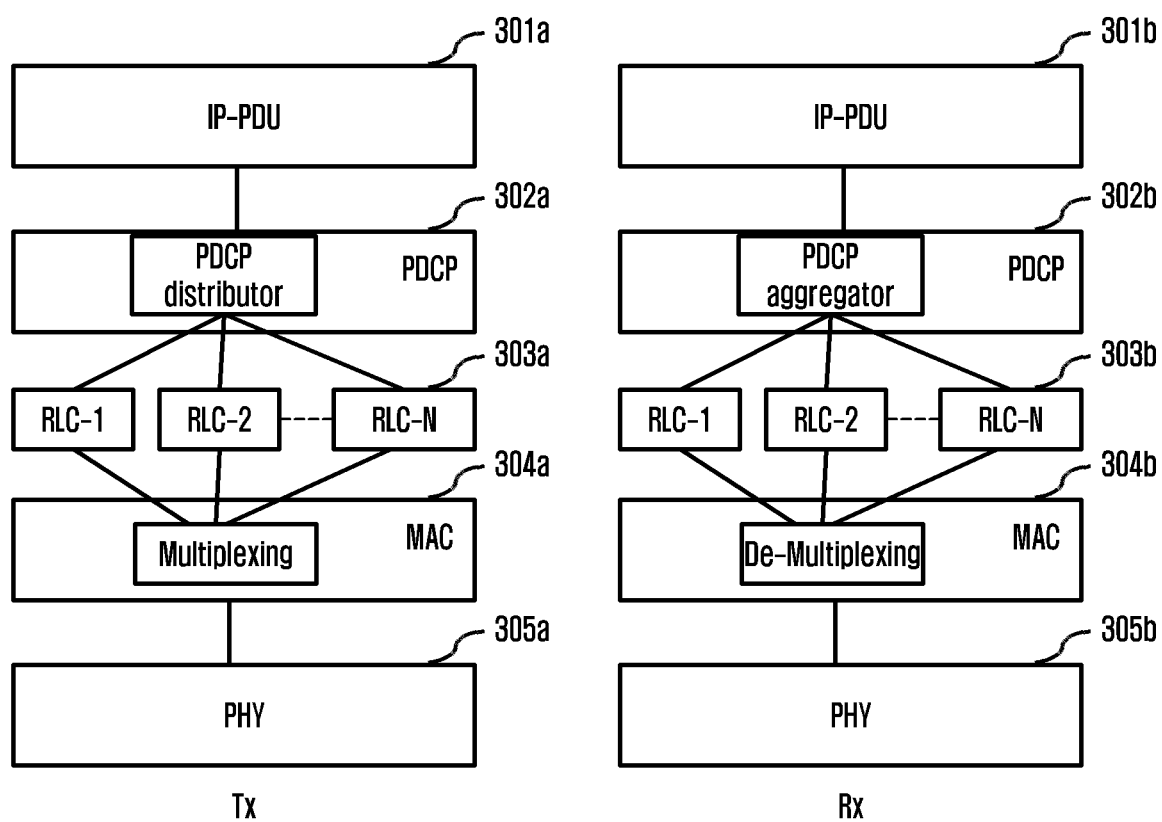
FIG. 3 is a diagram illustrating parallelization of the data packet processing per radio bearer flow, according to various embodiments.

FIG. 3 is a diagram illustrating parallelization of the data packet processing per radio bearer flow, according to various embodiments.

To achieve high data rates an example method is based on parallelization of data packet processing per radio bearer flow as illustrated in FIG. 3. Where at a transmitter (301a, 302a, 303a, 304a, 305a)/receiver (301b, 302b, 303b, 304b, 305b), the said transport layer (301a, 301b) flow is mapped to one radio flow at the PDCP layer (302a, 302b). In this case, radio flow mapped to multiple RLC sub-flows (303a, 303b) at the PDCP layer (302a, 302b) through functionality referred to as a distributor. The RLC layer (303a, 303b) functionality is performed independently on different threads either the same or logical cores for the said sub-flows, where there is no inter-dependency of the RLC layer (303a, 303b) functionality among the sub-flows. The MAC layer (304a, 304b) multiplexing the data packets from one or more sub-flows into one MAC data packet and delivering it to the PHY layer (305a, 305b) for transmission. Another possibility is in the case of multiple carriers, one RLC layer (303a, 303b) sub-flow can be mapped to one or many MAC carriers, also many RLC layers (303a, 303b) sub-flows can be mapped to a single MAC carrier as well or an RLC sub-flow can be mapped to multiple MAC entities/layer (304a, 304b) or one or many RLC sub-flows can be mapped to a single MAC entity/layer (304a, 304b).

The example method and procedure are applicable for any of the parallelization methods, which is required for high-speed data throughput for beyond 5G systems. The example method can be based on parallel RLC layer (303a, 303b) sub-flow design with a single MAC layer (304a, 304b), parallel RLC layer (303a, 303b) sub-flow design with multiple MAC entities/layer (304a, 304b), parallel PDCP layer (302a, 302b)+RLC layer (303a,303b) with single MAC entity/layer (304a, 304b), parallel PDCP layer (302a, 302b)+RLC layer (303a,303b) design with multiple MAC entities/layer (304a, 304b), parallel PDCP layer (302a, 302b)+RLC layer (303a,303b) design with distributor at PDCP (302a, 302b) only, data flow split at MAC entities/layer (304a, 304b) and having parallel PHY layer (305a, 305b), data flow split at PDCP (302a, 302b), with parallel MAC entities/layer (304a, 304b), data flow split at RLC (303a, 303b) with parallel MAC entities/layer (304a, 304b) and parallel layer (305a, 305b), data flow split at SDAP with parallel PDCP layer (302a, 302b), RLC layer (303a, 303b), MAC entities/layer (304a, 304b), PHY layer (305a, 305b).

The example architecture has multiple possibilities as mentioned above where one of design is one PDCP entity can have two or more RLC entities (LC) as shown in FIG. 3. In this case, both LC are mapped to the same MAC entity and same carrier. This is different from prior art where different logical channels are mapped to a different carrier. The PDCP can distribute the packets based on a threshold or sequentially or batch or any other method etc. to these different RLC entities or different flows. The same is applicable for any other designs which can be applied to any layer.

The example architecture's configuration of a PBR, a BSD, and other parameters required for the LCP procedure: There are multiple solutions through which these parameters can be configured and these methods are applicable for any architecture or any layer.

Define the PBR, BSD, or QoS parameters per radio bearer: In case DRB has multiple LCs, it can distribute equally among all the LCs. This may work in the case when the PDCP is equally distributing data among multiple logical channels.

$$\text{Total PBR for bearer=PBR (LC1)+PBR (LC2)} \quad (1)$$

The network (e.g. network entity) can also configure the PBR values for each LC e.g. LC1=PBR1 or LC2=PBR2, etc. where the sum of PBR1 and PBR2 is equal to the total PBR for that bearer. If the network can configure the PBR value for the bearer, and it is up to the UE to decide how it splits across multiple LC, that is an option. It may divide evenly among multiple LCs, or it may ensure that when allocating resources, the MAC entity or any other layer only allocates until the bearer's PBR value is reached. The LC under the same DRB can be configured with the same priority. Another QoS parameter like BSD, Bj can also be maintained per bearer or any other QoS parameter can be configured per bearer. The network can configure through an RRC message (it can be dedicated or common. The NW can configure the QOS parameter per DRB or Logical channel or logical channel group or DRB buffer or queue) or any other layer 2 messages (Layer 2 message can be through the MAC control element or any other MAC message, PDCP status or control PDU, RLC status or control PDU. These status PDU or message can have information of the QOS parameters), which can be configured per bearer or IP flow or TCP flow.

Define the PBR, BSD per LC: In this case, the network has to ensure if multiple LCs are configured under the same bearers, then configure the same value of PBR, BSD for each LC under the same DRB or flow or IP flow or anything equivalent to that which is configured for specific service.

Total PBR of logical channel=PBR (LC1)=PBR (LC2)  (2)

Another example could be to distribute the value of PBR, BSD among different LC. This distribution can be based on a split threshold set by the network or based on UE capability. This PBR can also be set based on the distribution mechanism at the PDCP layer. The network can align the PBR, BSD, or any other QoS parameters as per the distribution mechanism at PDCP or any other layers. A mechanism to derive these individual LCP parameters for each LC is required to ensure the total QoS criteria for the bearer.

Total PBR of bearer=PBR (LC1)+PBR (LC2)+PBR (LCx)  (3)

In any method of allocation of QOS parameters that contains PBR, BSD, Bj, etc., the network has to ensure that the values allocated to logical should not exceed the total QoS for that particular service or bearer. When changing the primary logical channel, the network may change the QOS values such as PBR, BSD, and so on. The network may also reconfigure the values for logical channels using the MAC control elements or RRC, which may configure the PBR threshold or value per logical channel. When any logical channel is enabled or disabled or activated or deactivated; network can (re) configure these values per logical channel or bearer through RRC or MAC control element or enable the configuration for pre-configured values.

Define the PBR, BSD per logical channel group (LCG): As per prior art, the LC group ID field identifies the group of LCs whose buffer status is being reported. The length of the field is 3 bits. The DRB having multiple logical channels can belong to a single logical channel group. The LCG should only contain the logical channel(s) belonging to the same bearer or same service. The LCG can also be named as radio bearer group which includes multiple LC belonging to the same bearer. The PBR, BSD can be configured per LCG or radio bearer group. This radio bearer group may also have logical channels which are mapped to different bearers. The LCG can be associated with a single bearer or multiple bearers.

Total PBR of LCG=PBR (LC1)+PBR (LC2)+PBR (LCx)  (4)

Where these LC can map to the same bearer or flow or IP or application or service. The distribution of these values depends on the PDCP distribution scheme as mentioned above which can be based on a specific threshold or batching or sequential scheme.

Define the PBR, BSD per bearer buffer or bearer queue: MAC or any other layer can maintain the bearer queue and store the data from the different LC in it. In this case, multiple logical channels associated or flow with the same buffer are configured with a particular queue which is per bearer. The network can configure PBR, BSD per bearer buffer, or bearer queue. Each bearer or IP flow or PDCP entity or SDAP entity or MAC entity can have a specific queue that stores data from multiple SDAP entities or PDCP entity or RLC entity or MAC entity. Network (NW) can configure the PBR, BSD and other QoS parameters based on this buffer queue so LCP or any other procedures which are used to allocate the resources can run the algorithm on these queues. This queue can be configured per bearer or application or specific service or based on QCI or QoS. UE and network can add the logical channel or bearer identifier or any other identifier for packets.

Proposed LCP procedure or Resource allocation Procedure: Various possible methods to perform the LCP or Resource allocation Procedure are illustrated as below.

The concept of LCP at bearer level Resource selection: LCP procedure currently is defined per logical channel which is associated with specific bearers. In this new approach one bearer can have multiple LC's so each LC may not be efficient and lead to starvation of low priority logical channel or reordering issue. LCP or data bearer prioritization procedure can be per bearer or DRB. The network can configure each DRB through RRC message with bearer priority, bearer PBR, bearer BSD, and other associated parameters required to form MAC SDU. Bj can be maintained for each bearer (Bj which is maintained for each bearer j).

The UE variable Bj is used for the LCP procedure: The MAC entity shall initialize Bj of the bearer to zero when the bearer is established. For each bearer j, irrespective of the total LCH the bearer is mapped to, the MAC entity shall update all the following at the bearer level:
  a. Increment Bj by the product PBR×T before every instance of the LCP procedure, where T is the time elapsed since Bj was last incremented;
  b. if the value of Bj is greater than the bucket size (e.g. PBR×BSD):
    i. Set Bj to the bucket size.

The exact moment(s) when the UE updates Bj between LCP procedures is up to UE implementation, as long as Bj is up to date at the time when a grant is processed by LCP.

The rules for the selection of bearer are similar as defined for a selection of LC in TS 38.321. UE allocates resources to the bearers in the following steps:
  a. Step A: All the bearers are allocated resources in a decreasing priority order up to their PBR.
  b. Step B: if any resources remain, all the bearers are served in strict decreasing priority order until either the data for or that bearer or the UL grant is exhausted, whichever comes first.

Each bearer includes multiple logical channels. There is a need to define the handling of multiple LCs under the same bearer. The selection of LC for the allocation of resources depends upon the distribution scheme at PDCP. There is a need to define the new mechanism where the UE should select the next LCH based on distribution/selection in the previous TTI. The one way could it within the same bearer as all-LC have same priority then LC with high Bj value under same priority should be chosen first. In this case, the UE has to maintain the Bj per LC also which can be handled by the existing LCP mechanism. The UE can also maintain some other parameter that can indicate the data that a particular LC is having. The NW may configure PBR, BSD per LC or these can be handled per bearer. The selection of LC can also be based on a round-robin manner. If the distribution scheme is based on sequential allocation then the UE should allocate resources accordingly, if there is batch processing then allocation should be aligning to that. The same holds for other methods like based on threshold and another mechanism.

For example, take a case of LC1 and LC2 under the same bearer, say the distribution of packets is done to the first LC1 and then LC2. UE should first allocate resources for LC1, The allocation of resources can be fixed say x RLC PDUs, and then move to another LC2. This can also be done as per the PBR limit set for each logical channel. If there are multiple logical channels with the same priority under the same bearer or different bearer then LC can be selected with a high Bj value or equivalent parameter which can refer to buffer status for that logical channel under the same priority. To avoid any reordering issues and error scenarios, resource allocation should be aligned to the distribution mechanism per logical channel.

The MAC entity shall, when a new transmission is performed logical channels selected for the UL, grant with Bj>0 or LC with high Bj value under same priority are allocated resources in decreasing priority order. If the PBR of a logical channel is set to infinity, the MAC entity shall allocate resources for all the data that is available for transmission on the logical channel before meeting the PBR of the lower priority logical channel(s); decrement Bj by the total size of MAC SDUs served to logical channel j above.

In another example (306), each DRB can be configured with priority, PBR, BSD and other associated parameters required to form MAC SDU. The UE allocates resources to the bearers in the following steps,
  a. Step A: All the bearers are allocated resources in a decreasing priority order up to their PBR ("1", "2", and "3").
  b. Step B: Resources have been allocated to multiple logical channels under the same bearer—Handling of multiple logical channels under the same bearer ("4", "5", and "6").
    i. The selection of a logical channel for the allocation of resources depends upon the distribution scheme at PDCP and/or PBR value (if configured).
    ii. In the example distribution scheme is considered as sequential or batch and PBR is set as equal.
  c. Step C: if any resources remain, all the bearers are served in strict decreasing priority order until either the data for that bearer or the UL grant is exhausted, whichever comes first ("7", "8").

LCP at LCG: Each LCG can be configured with priority, PBR, BSD, and other associated parameters required to form MAC SDU. Bj can be maintained for each LCG. The UE allocates resources to the LCG in the following steps:
  a. Step A: All the LCG are allocated resources in a decreasing priority order up to their PBR.
  b. Step B: if any resources remain, all the LCG are served in strict decreasing priority order until either the data for that LCG or the UL grant is exhausted, whichever comes first.

To handle the multiple LCs under the same LCG, there is a need to define selection criteria. The selection of LC for the allocation of resources depends upon the distribution scheme at PDCP.

For example, take a case of LC1 and LC2 under the same LCG group. The UE should first allocate resources for LC1, The allocation of resources can be fixed say X RLC PDUs, then move to another LC2. This can also be done as per the PBR limit set for each logical channel. If there are multiple logical channels with the same priority under the same LCG or different LCG then LC can be selected with a high Bj value under the same priority. Another possibility could be MAC can allocate the resources till the logical channel have data e.g. schedule the LCH until data is available, rather than till Bj.

Enhancements to existing LCP: Each Logical channel can be configured with priority, PBR, BSD, and other associated parameters required to form MAC SDU. The network may configure a single PBR, BSD which is applicable for each logical channel under the same bearer. Bj can be maintained for each LC. The UE allocates resources to the LC in the following steps, all the LCs are allocated resources in a decreasing priority order up to their PBR or based on distribution mechanism at the PDCP level.

If PDCP is distributing packets sequentially or in batch then MAC should also allocate the resources accordingly: this is applicable for LC with the same priority or under the same bearer, the PBR can be taken care of while selecting data from different LC.

If PDCP is distributing packets based on threshold then MAC should also allocate the resources accordingly: the MAC should first allocate the resources to the logical channel which is primary LC then should allocate the resources to another secondary LC under the same bearer, the amount of allocation is based on the threshold value and PBR can be taken care while allocating resources, the next time allocation can be first done to secondary LC to ensure to avoid reordering delay, and the selection of LC for allocation of resources depends upon distribution scheme at PDCP.

LCP per bearer buffer or bearer queue: Each bearer queue can be configured with priority, PBR, BSD, and other associated parameters required to form MAC SDU. The network may configure a single PBR, BSD which is applicable for each bearer queue (Bj can be maintained for each LCG).

The PDCP is distributing packets sequentially or in batch to different logical channels and after processing these packets can be delivered to a specific bearer or buffer queue, the UE allocates resources to the bearer queue in the following steps:
  a. Step A: All the LCG are allocated resources in a decreasing priority order up to their PBR.
  b. Step B: if any resources remain, all the LCG are served in strict decreasing priority order until either the data for that LCG or the UL grant is exhausted, whichever comes first.

Handling of data and control plane LC: In case there are only two logical channels per bearer one is having Control data like RLC status or TCP ACK or PDCP status and the other is dedicated to data. Then MAC should allocate the resources first to the LC which is carrying the control plane and then allocate the resources to LC which is carrying data. The network can allocate the PBR, BSD as per defined methods. The UE allocates resources to the bearer queue in the following steps:
  a. Step A: All the LC carrying control planes are allocated resources in a decreasing priority order up to their PBR
  b. Step B: All the LC carrying data planes are allocated resources in a decreasing priority order up to their PBR If any resources remain, all the LC are served in strict decreasing priority order until either the data for that LC or the UL grant is exhausted, whichever comes first.

The above methods are described by considering the split at RLC but all these methods can be applicable and scalable to any module which can be acting as aggregator or distribution say if there is split at PDCP then resource allocation can be done per QOS flow or bearer level. In case UE has multiple MAC entities which can be mapped to the same or multiple carrier or cells or RAT. In that case allocation of resources can be handled based on the NW configuration, mapping between the MAC entity and Logical channel or flow or bearer, or any other combination. The same logic can be extended if the MAC entity is getting multiple grants in the same TTI. The selection of bearer or flow or logical channel can be based on any of the above-mentioned rules and combination of allocation of NW parameters and selection of resource allocation procedure.

Figure 4A:
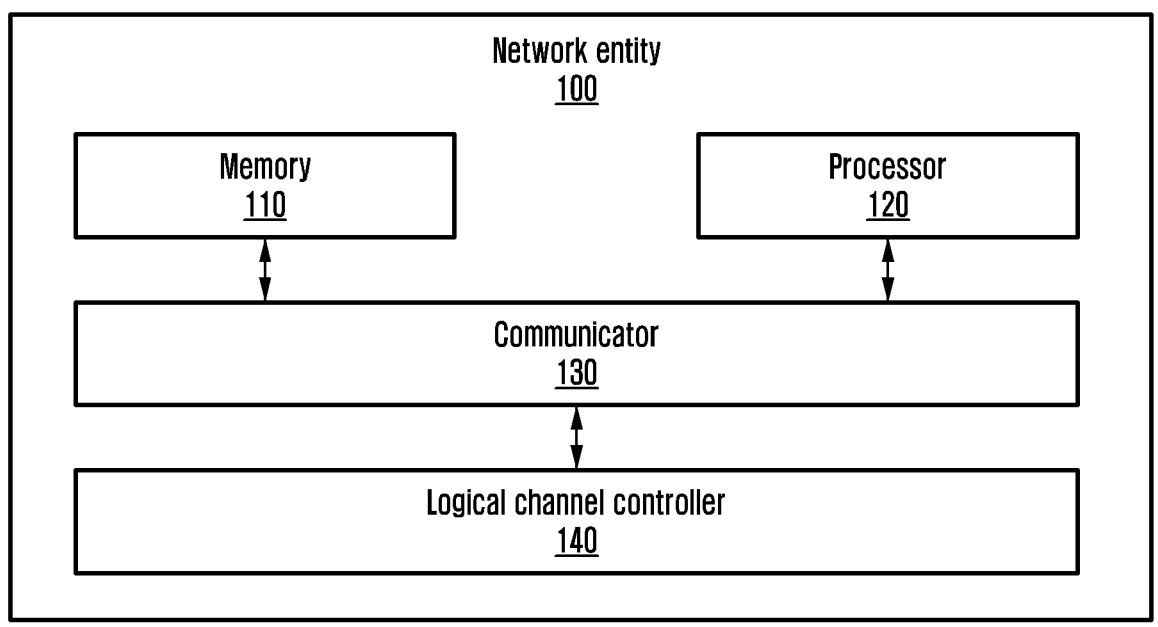
FIG. 4A is a block diagram illustrating an example configuration of a network entity for prioritizing the logical channel(s) in 6G networks and beyond, according to various embodiments.

FIG. 4A is a block diagram illustrating an example configuration of a network entity (100) (e.g. server, base station, eNodeB, gNodeB, cloud network, etc.) for prioritizing the logical channel(s) in the Beyond 5G, 6G networks and beyond, according to various embodiments.

In an embodiment, the network entity (100) includes a memory (110), a processor (e.g., including processing circuitry) (120), a communicator (e.g., including communication circuitry) (130), and a logical channel controller (e.g., including various circuitry) (140).

The memory (110) stores a QoS parameter (e.g. a priority, a Prioritized Bit Rate (PBR), a Bucket Size Duration (BSD), and a UE parameter (Bj), etc.) and a PDCP distribution (e.g. a sequential distribution or a random distribution, a block distribution or a batch distribution, and a split threshold-based distribution). Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The "non-transitory" storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the network entity (100), a cloud storage, or any other type of external storage.

The processor (120) may include various processing circuitry and communicates with the memory (110), the communicator (130), and the logical channel controller (140). The processor (120) is configured to execute instructions stored in the memory (110) and to perform various processes. The processor (120) may include one or a plurality of processors, including a general-purpose processor, such as, for example, and without limitation, a central processing unit (CPU), an application processor (AP), a dedicated processor, or the like, a graphics-only processing unit such as a graphics processing unit (GPU), a visual processing unit (VPU), and/or an Artificial intelligence (AI) dedicated processor such as a neural processing unit (NPU).

The communicator (130) includes an electronic circuit specific to a standard that enables wired or wireless communication. The communicator (130) is configured for communicating internally between internal hardware components and with external devices via one or more networks.

In an embodiment, the logical channel controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the logical channel controller (140) receives a plurality of data packets to be prioritized belonging to a Data Radio Bearer (DRB) from a network to a User Equipment (UE) (200) using a plurality of logical channels. Further, the logical channel controller (140) configures a Quality of Service (QoS) parameter, where the QoS parameter comprises a priority, a Prioritized Bit Rate (PBR), a Bucket Size Duration (BSD), and a UE parameter (Bj). The QoS parameter is configured through one of a Radio Resource Control (RRC) message and a layer-2 message.

Further, the logical channel controller (140) configures the PBR and the BSD based on the DRB and/or configures the PBR and the BSD based on the LCG and/or configures the PBR and the BSD based on the DRB buffer or queue and/or configures the PBR and the BSD based on the logical channel.

Further, the logical channel controller (140) detects that the DRB with a logic channel and configures a value of the PBR, the BSD, and the UE parameter for each DRB, where each DRB comprises the plurality of logical channels.

Further, the logical channel controller (140) detects that the DRB have multiple logic channel, where the multiple logic channel belongs to a single LCG and configures a value of the PBR, the BSD, and the UE parameter for each LCG, where each LCG comprises the plurality of logical channels, where each LCG comprises a unique Identity (ID).

Further, the logical channel controller (140) configures a value of the PBR, the BSD, and the UE parameter for each DRB buffer or queue, where each MAC entity of the network entity (100) maintains the DRB buffer or queue and stores data of the DRB buffer or queue from different logical channel under same DRB bearer or IP flow. Where resource allocation directly run on the DRB buffer or queue and size of the DRB buffer or queue depends on a transmitting window of RLC, and is based on the PBR and the BSD.

Further, the logical channel controller (140) detects that multiple logic channel under same DRB and configures a value of the PBR, the BSD, and the UE parameter for each logical channel of the plurality of logical channels.

Further, the logical channel controller (140) allocates the configured QoS parameter to the DRB by distributing the value of the PBR and the BSD among multiple logic channels based on a PDCP distribution, where the network entity (100) is configured the PDCP distribution in a Radio Resource Control (RRC) message. The PDCP distribution comprises a sequential distribution or a random distribution, a block distribution or a batch distribution, and a split threshold-based distribution. Further, the logical channel controller (140) assigns a PDCP-Protocol Data Unit (PDU) to a sub-flow of a Radio link control (RLC) in a round-robin manner in the sequential distribution or the random distribution and maps the PDCP-PDU to the sub-flow of the RLC. Further, the logical channel controller (140) maps a batch of sequential PDCP-PDUs to a sub-flow of the RLC and/or maps the PDCP-PDUs with least buffer occupancy and/or maps the PDCP-PDUs based on a processing capability of the UE (200) and/or maps the PDCP-PDUs based on a number of transmissions of the plurality of data packets in the block distribution or the batch distribution.

Further, the logical channel controller (140) determines whether the PDCP distribution is the sequential distribution or the block distribution. Further, the logical channel controller (140) equally distributes the value of the PBR to each logical channel of the plurality of logical channels in response to determining that the PDCP distribution is the sequential distribution or the block distribution. Further, the logical channel controller (140) distributes the value of the PBR to each logical channel of the plurality of logical channels based on an uplink split threshold value in response to determining that the PDCP distribution is not the sequential distribution or the block distribution, where the uplink split threshold configured by the network entity (100) or based on the capability of the UE (200).

Further, the logical channel controller (140) configures the uplink split threshold. Further, the logical channel controller (140) determines whether data available for transmission is larger than or equal to the uplink split threshold. Further, the logical channel controller (140) maps PDCP-PDUs to a primary logical channel of the plurality of logical channels in response to determining that the data available for transmission is larger than or equal to the uplink split threshold. Further, the logical channel controller (140) maps PDCP-PDUs to a-second logical channel of the plurality of logical channels in response to determining that the data available for transmission is not larger than or equal to the uplink split threshold.

Further, the logical channel controller (140) divides the QoS parameter across one of a DRB, a logical channel, a Logical Channel Group (LCG), and a DRB buffer or queue. Further, the logical channel controller (140) sends the plurality of data packets as per the PBR.

Further, the logical channel controller (140) sends a resource to the UE (200), where the UE (200) sends a transport block using scheduling to inform a Modulation and Coding Scheme (MCS), no of resource blocks through which the UE (200) determines size of the transport block.

Although the FIG. 4A shows various hardware components of the network entity (100) it is to be understood that other embodiments are not limited thereto. In various embodiments, the network entity (100) may include less or more number of components. Further, the labels or names of the components are used only for illustrative purpose and does not limit the scope of the disclosure. One or more components can be combined together to perform same or substantially similar function to logical channel management in the wireless network.

Figure 4B:
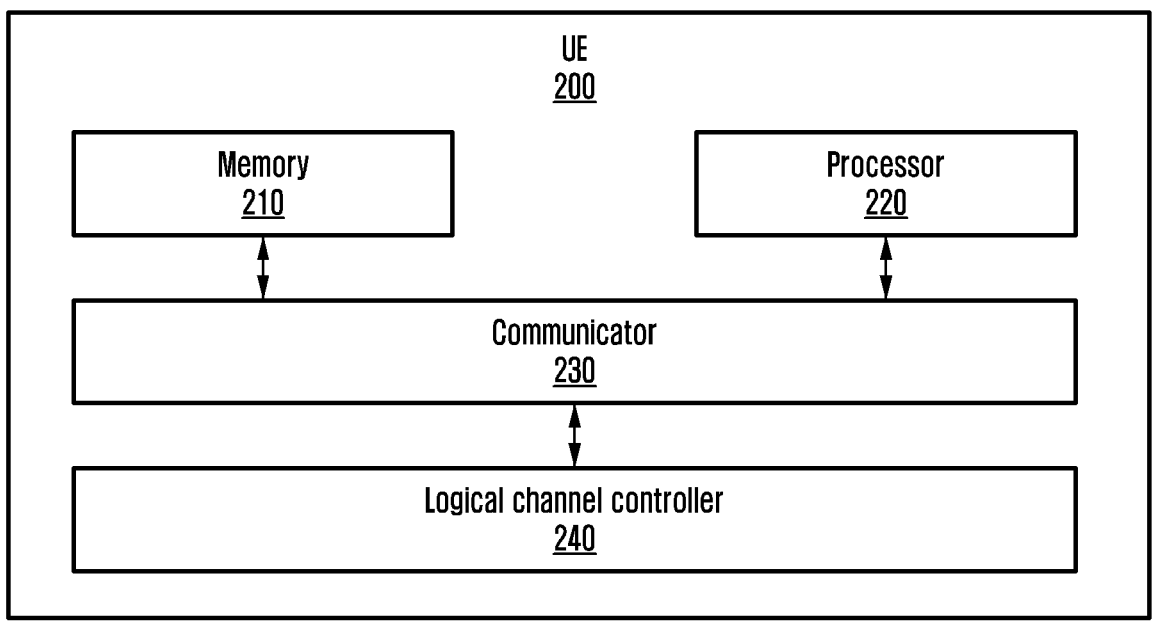
FIG. 4B is a block diagram illustrating an example configuration of a UE entity for prioritizing the logical channel(s) in the 6G networks and beyond, according to various embodiments.

FIG. 4B is a block diagram illustrating an example configuration of the UE (200) entity for prioritizing the logical channel(s) in the 6G networks and beyond, according to various embodiments.

In an embodiment, the UE (200) includes a memory (210), a processor (e.g., including processing circuitry) (220), a communicator (e.g., including communication circuitry) (230), and a logical channel controller (e.g., including various circuitry) (240).

The memory (210) stores the QoS parameter the PDCP distribution and resource(s). Further, the memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The "non-transitory" storage medium is not embodied in a carrier wave or a propagated signal. However, the term "non-transitory" should not be interpreted that the memory (210) is non-movable. In some examples, the memory (210) can be configured to store larger amounts of information. In certain examples, a non-transitory storage medium may store data that can, over time, change (e.g., in Random Access Memory (RAM) or cache). The memory (210) can be an internal storage unit or it can be an external storage unit of the UE (200), a cloud storage, or any other type of external storage.

The processor (220) may include various processing circuitry and communicates with the memory (210), the communicator (230), and the logical channel controller (240). The processor (220) is configured to execute instructions stored in the memory (210) and to perform various processes. The processor (220) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230) includes an electronic circuit specific to a standard that enables wired or wireless communication. The communicator (230) is configured for communicating internally between internal hardware components and with external devices via one or more networks.

In an embodiment, the logical channel controller (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the logical channel controller (240) receives the resource from the network entity (100). Further, the logical channel controller (240) allocates the received resource to one of the DRB, the logical channel, the LCG, and the DRB buffer, where the resource is allocated in decreasing priority order up to corresponding the PBR and the resource is allocated based on the PDCP distribution. Further, the logical channel controller (240) determines whether the PDCP distribution is the sequential distribution. Further, the logical channel controller (240) selects data PDU from each logical channel until the PBR limit is reached in response to determining that the PDCP distribution is the sequential distribution. Further, the logical channel controller (240) selects data PDU in batches from each logical channel until the PBR limit is reached in response to determining that the PDCP distribution is nor the sequential distribution.

Further, the logical channel controller (240) determines whether the data PDU is pending in a logical channel. Further, the logical channel controller (240) determines whether the detected data PDU in a strict decreasing priority order in response to determining that the data PDU is pending in the logical channel. Further, the logical channel controller (240) allocates pending resources to all the DRB or LCG or bearer queue until either the data PDU for that DRB or a UL grant is exhausted for that DRB when the data PDU is pending in the logical channel.

Although the FIG. 4B shows various hardware components of the UE (200) it is to be understood that other embodiments are not limited thereto. In various embodiments, the UE (200) may include less or more number of components. Further, the labels or names of the components are used only for illustrative purpose and does not limit the scope of the disclosure. One or more components can be combined together to perform same or substantially similar function to logical channel management in the wireless network.

Figure 5A:
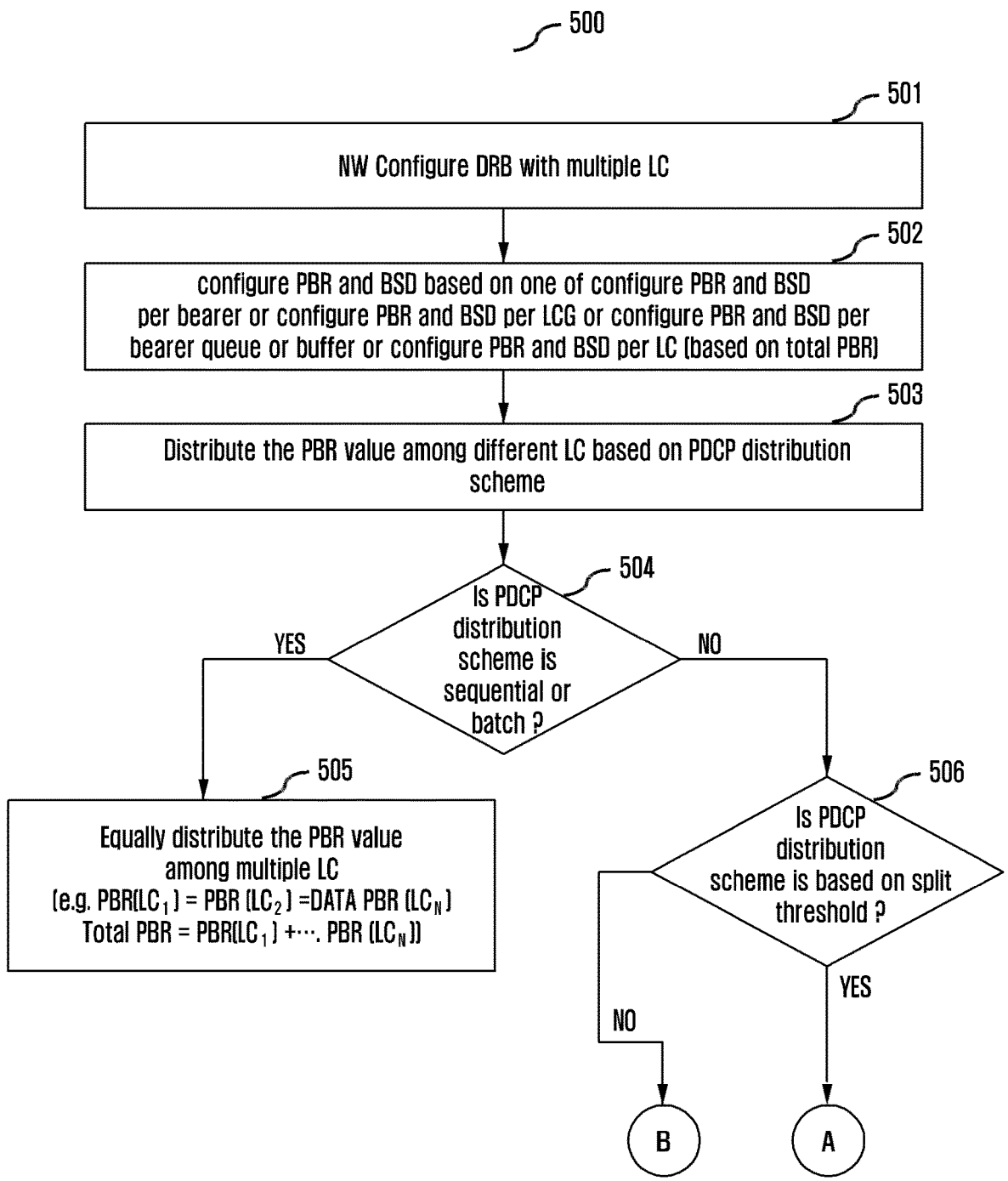
FIGS. 5A and 5B are flowcharts illustrating an example method for configuring Quality of Service (QoS) parameter values for management of logical channel(s) in the 6G networks and beyond, according to various embodiments.
Figure 5B:
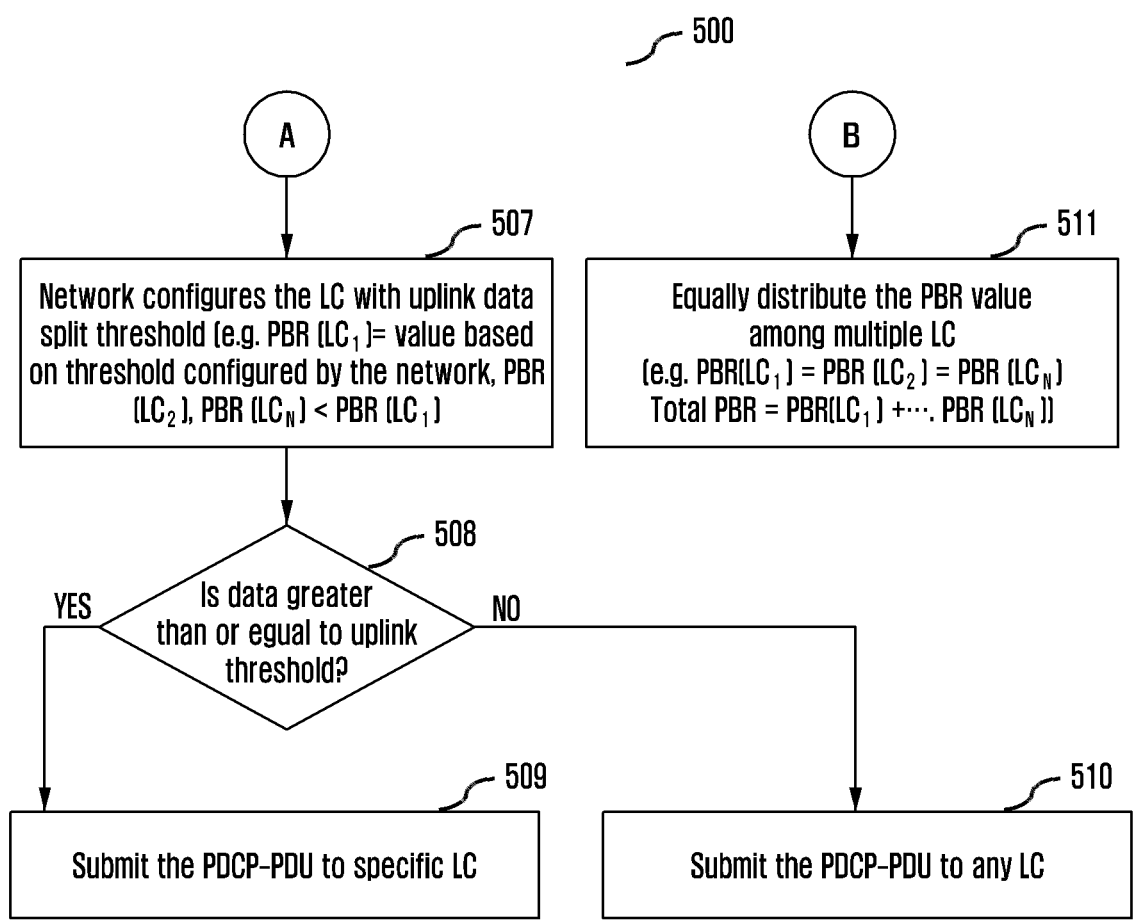

FIGS. 5A and 5B are flowcharts (500) illustrating an example method for configuring the QoS parameter values for management of logical channel(s) in 6G networks and beyond, according to various embodiments. The operations (501, 502, 503, 504, 505, 506, 507, 508, 509, 510 and 511) are performed by the network entity (100).

At 501, the method includes configuring DRB with multiple LCs. At 502, the method includes the network entity (100) configures PBR and BSD based on one of configuring PBR and BSD per bearer or configuring PBR and BSD per LCG or configuring PBR and BSD per bearer queue or buffer or configuring PBR and BSD per LC (based on total PBR). At 503, the method includes distributing the value of the PBR and the BSD among multiple LCs based on the PDCP distribution, where the network entity (100) is configured the PDCP distribution in the RRC message. The PDCP distribution comprises the sequential distribution or the random distribution, the block distribution or the batch distribution, and the split threshold-based distribution. A distributor functionality distributes the packets to the RLC sub-flow either sequentially or randomly. In this it assigns PDCP PDUs to RLC sub-flows in round-robin manner, any PDCP PDU mapped to any RLC sub-flow. In a Batch or a Block distribution scheme, a batch of Sequential PDCP PDUs mapped to one RLC sub-flow. Which can be further decided based on load based upon buffer occupancy where the PDCP distributor maps the PDCP PDU to the RLC sub-flow with the least buffer occupancy. Another could be processing capability based, in this the PDCP distributor maps the PDCP PDU to the RLC sub-flow having max idle time. Another possibility could be a heuristic-based approach, where it distributes based on additional information like a number of retransmissions, etc. Or it can be a combination of any of the above schemes/approaches.

At 504, the method includes determining whether the PDCP distribution is the sequential distribution/the random distribution or the block distribution/the batch distribution. At 505, the method includes equally distributing the value of the PBR to each logical channel of the plurality of logical channels in response to determining that the PDCP distribution is the sequential distribution/the random distribution or the block distribution/the batch distribution (e.g. PBR (LC1)=PBR (LC2)=PBR (LCN) Total PBR=PBR (LC1)+ . . . . PBR (LCN)). At 506, the method includes distributing the value of the PBR to each logical channel of the plurality of logical channels based on an uplink split threshold value in response to determining that the PDCP distribution is not the sequential distribution/the random distribution or the block distribution/the batch distribution, where the uplink split threshold configured by the network entity or based on the capability of the UE (200).

At 507, the method includes configuring the uplink split threshold (e.g. PBR (LC1)=value based on threshold configured by the network, PBR (LC2), PBR (LCN)<PBR (LC1). At 508, the method includes determining whether data available for transmission is larger than or equal to the uplink split threshold. At 509, the method includes mapping PDCP-PDUs to a primary logical channel of the plurality of logical channels in response to determining that the data available for transmission is larger than or equal to the uplink split threshold. At 510, the method includes mapping PDCP-PDUs to the second logical channel of the plurality of logical channels in response to determining that the data available for transmission is not larger than or equal to the uplink split threshold. At 511, the method includes equally distributing the value of the PBR to each logical channel of the plurality of logical channels in response to determining that the PDCP distribution is the sequential distribution/the random distribution or the block distribution/the batch distribution (e.g. PBR (LC1)=PBR (LC2)=PBR (LCN) Total PBR=PBR (LC1)+ . . . PBR (LCN)).

In the case of the PBR, the BSD parameters are configured per bearer queue or buffer. Each MAC entity maintains this queue per bearer. This queue or buffer can store the data from different logical channels under the same bearer or IP flow. The NW can configure the PBR, the BSD per bearer buffer, or bearer queue. The resource allocation will directly run on the bearer queue or buffer. Size of bearer queue can be either depending on RLC TX window or multiplication of the BSD and the PBR (e.g. BSD×PBR) that is the maximum UL data a bearer can buffer.

The various actions, acts, blocks, steps, or the like in the flow diagram (500) may be performed in the order presented, in a different order or simultaneously. Further, in various embodiments, some of the actions, acts, blocks, steps, or the like may be omitted, added, modified, skipped, or the like without departing from the scope of the disclosure.

Figure 6:
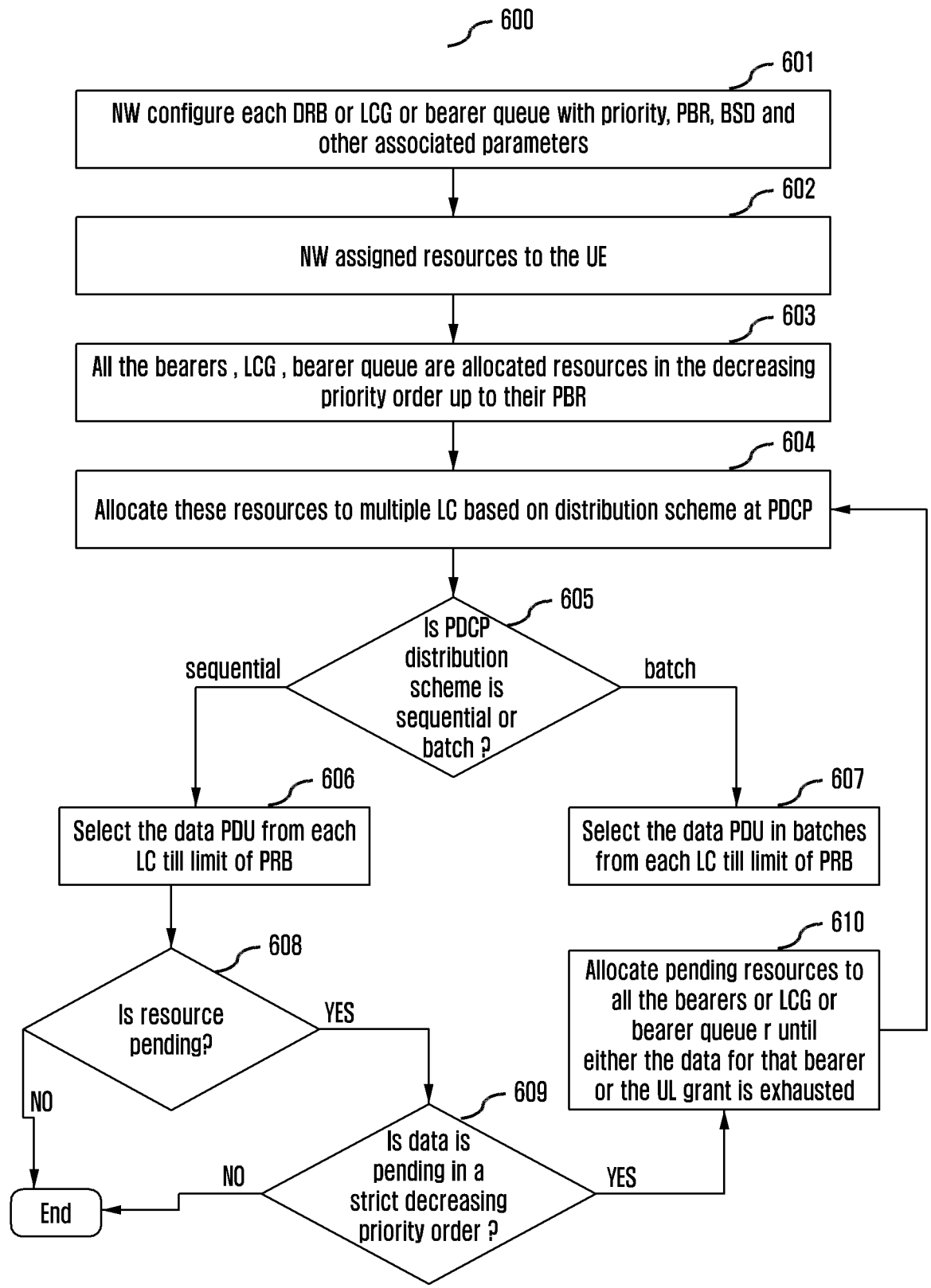
FIG. 6 is a flowchart illustrating an example method for allocating resource(s) in the 6G networks and beyond, according to various embodiments.

FIG. 6 is flowchart (600) illustrating an example method for allocating resource(s) in the 6G networks and beyond, according to various embodiments. The operations (601, 602, 603, 604, 605, 606, 607, 608, 609 and 610) are performed by the network entity (100) and the UE (200).

The UE (200) allocates resources to the bearers in the following steps:
  a. Step A: All the bearers are allocated resources in a decreasing priority order up to their PBR.
  b. Step B: Resources have been allocated to multiple logical channels under the same bearer. The selection of a logical channel for the allocation of resources depends upon the distribution scheme at PDCP and/or PBR value.
  c. Step C: if any resources remain, all the bearers are served in strict decreasing priority order until either the data for that bearer or the UL grant is exhausted, whichever comes first.

At 601, the method includes the network (NW) configuring each DRB or LCG or bearer queue with the priority, the PBR, the BSD and other associated parameters. At 602, the method includes sending/assigning the resource to the UE (200), where the UE (200) sends the transport block using scheduling to inform the MCS, no of resource blocks through which the UE (200) determines size of the transport block. At 603-604, the method includes allocating the received resource to one of the DRB, the logical channel, the LCG, and the DRB buffer, where the resource is allocated in the decreasing priority order up to corresponding the PBR and the resource is allocated based on the PDCP distribution.

At 605, the method includes determining whether the PDCP distribution is the sequential distribution or the batch distribution. At 606, the method includes selecting data PDU from each logical channel until the PBR limit is reached in response to determining that the PDCP distribution is the sequential distribution. At 607, the method includes selecting data PDU in batches from each logical channel until the PBR limit is reached in response to determining that the PDCP distribution is nor the sequential distribution. At 608, the method includes detecting whether the data PDU is pending in the logical channel At 609, the method includes detecting whether the detected data PDU in a strict decreasing priority order in response to determining that the data PDU is pending in the logical channel. At 610, the method includes allocating pending resources to all the DRB or LCG or bearer queue until either the data PDU for that DRB or the UL grant is exhausted for that DRB.

The various actions, acts, blocks, steps, or the like in the flow diagram (600) may be performed in the order presented, in a different order or simultaneously. Further, in some embodiments, some of the actions, acts, blocks, steps, or the like may be omitted, added, modified, skipped, or the like without departing from the scope of the disclosure.

Figure 7:
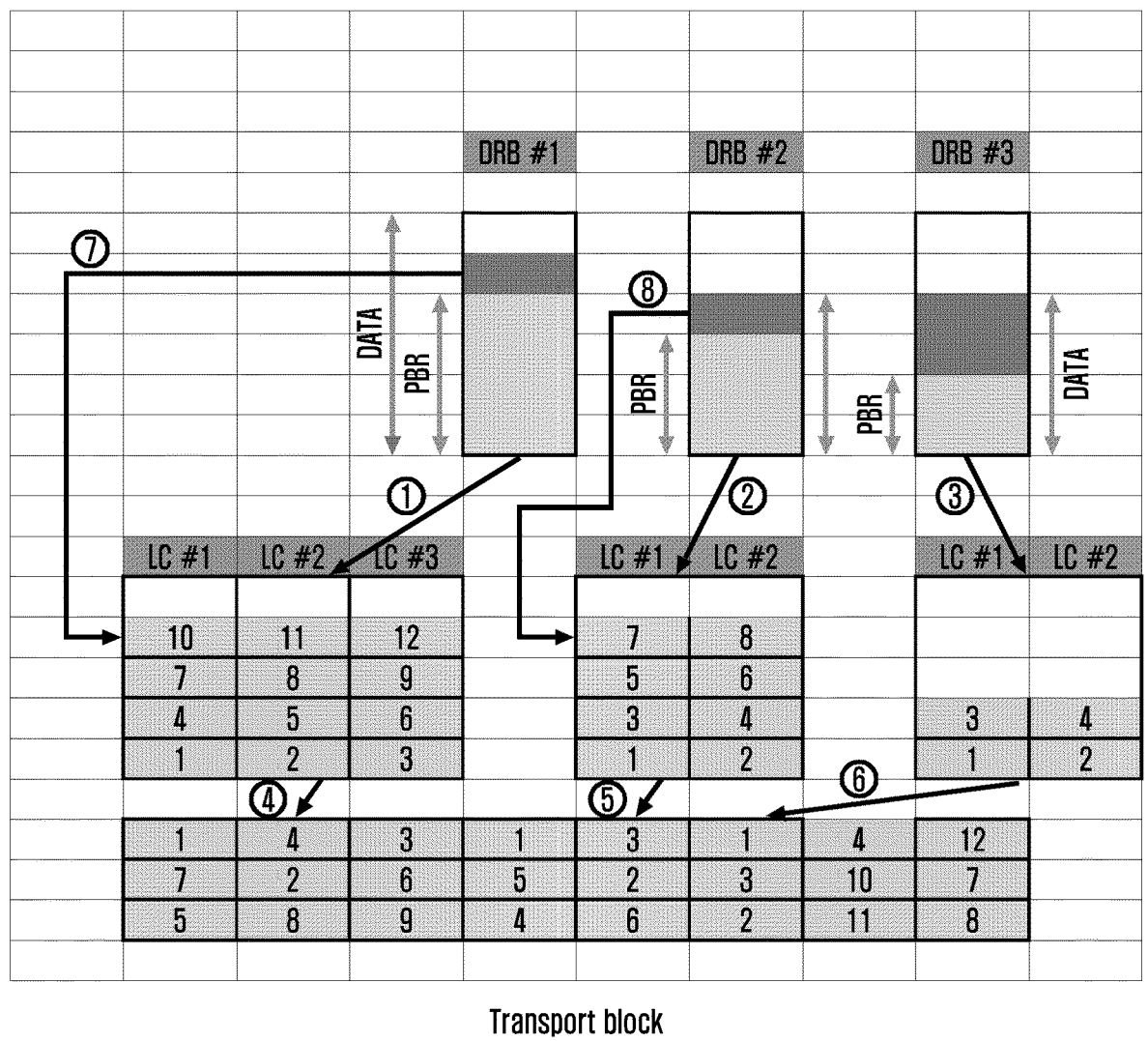
FIG. 7 is a diagram illustrating an example method for allocating resource(s) in the 6G networks and beyond, according to various embodiments.

FIG. 7 is a diagram illustrating an example of a method for allocating resource(s) in the 6G networks and beyond, according to various embodiments.

Each DRB can be configured with priority, bearer PBR, BSD, and other associated parameters required to form MAC SDU. The UE (200) allocates resources to the bearers in the following steps:
   a. Step A: All the bearers are allocated resources in a decreasing priority order up to their PBR, as indicated by the numbers (1, 2, and 3).
   b. Step B: Resources have been allocated to multiple logical channels under the same bearer—handling of multiple logical channels under the same bearer, as indicated by the numbers (4, 5, and 6). The selection of a logical channel for the allocation of resources depends upon the distribution scheme at PDCP and/or PBR value (if configured). In the example distribution scheme is considered as sequential or batch and PBR is set as equal
   c. Step C: if any resources remain, all the bearers are served in strict decreasing priority order until either the data for that bearer or the UL grant is exhausted, whichever comes first, as indicated by the numbers (7, 8).

The embodiments disclosed herein can be implemented using at least one hardware device and performing network management functions to control the elements.

The foregoing description of the various example embodiments will reveal the general nature of the embodiments herein so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the disclosure has been illustrated and described with reference to various example embodiments, it will be understood that the various example embodiments are intended to be illustrative, not limiting. It will be further understood, by those skilled in the art that various changes in form and detail may be made without departing from the true spirit and full scope of the disclosure, including the appended claims and their equivalents.

What is claimed is:

1. A method performed by a network entity in a wireless network, the method comprising:
   identifying, by the network entity, a Data Radio Bearer (DRB) associated with multiple logical channels;
   identifying, by the network entity, a total Prioritized Bit Rate (PBR) value for the DRB;
   determining a packet data convergence protocol (PDCP) distribution scheme; and
   determining, by the network entity, a value for each logical channel of the multiple logical channels associated with the DRB based on the total PBR value for the DRB,
   wherein the total PBR value for the DRB is distributed to each logical channel based on the PDCP distribution scheme, and
   wherein the PDCP distribution scheme comprises at least one of a sequential distribution, a random distribution, a block distribution, a batch distribution, or an uplink split threshold-based distribution.

2. The method as claimed in claim 1, wherein the total PBR value for the DRB is configured through at least one of a Radio Resource Control (RRC) message or a layer-2 message.

3. The method as claimed in claim 1, wherein the network entity configures the PDCP distribution scheme based on a Radio Resource Control (RRC) message.

4. The method as claimed in claim 1, wherein the sequential distribution or the random distribution comprises:
   assigning, by the network entity, at least one PDCP-Protocol Data Unit (PDU) to at least one sub-flow of a Radio link control (RLC) in a round-robin manner; and
   mapping, by the network entity, the at least one PDCP-PDU to the at least one sub-flow of the RLC.

5. The method as claimed in claim 1, wherein the block distribution or the batch distribution comprises at least one of:
   mapping, by at least one of the network entity or a UE, a batch of sequential PDCP-Protocol Data Units (PDUs) to at least one sub-flow of a Radio link control (RLC);
   mapping, by the at least one of the network entity or the UE, the PDCP-PDUs with least buffer occupancy;
   mapping, by the network entity, the PDCP-PDUs based on a processing capability of the UE; or
   mapping, by the at least one of the network entity or the UE, the PDCP-PDUs based on a number of transmissions of a plurality of data packets.

6. The method as claimed in claim 1, wherein determining the PBR value for each logical channel comprises:
   determining, by the network entity, whether the PDCP distribution scheme is a sequential distribution or a block distribution; and
   performing, by the network entity, one of:
      equally distributing the total PBR value for the DRB to each logical channel of the multiple logical channels in response to determining that the PDCP distribution scheme is the sequential distribution or the block distribution; or
      distributing the total PBR value for the DRB to each logical channel of the multiple logical channels based on an uplink split threshold value in response to determining that the PDCP distribution scheme is not the sequential distribution or the block distribution, wherein the uplink split threshold value is configured by the network entity or based on a capability of a UE.

7. The method as claimed in claim 6, wherein distributing the total PBR value for the DRB to each logical channel of the multiple logical channels based on the uplink split threshold value comprises:
   configuring, by the network entity, the uplink split threshold value;
   determining, by the network entity, whether data available for transmission is larger than or equal to the uplink split threshold value; and performing, by the network entity, one of:
mapping PDCP-Protocol Data Units (PDUs) to a primary logical channel of the multiple logical channels in response to determining that data available for transmission is larger than or equal to the uplink split threshold value; and
mapping PDCP-PDUs to at least one-second logical channel of the multiple logical channels in response to determining that the data available for transmission is not larger than or equal to the uplink split threshold value.

8. The method as claimed in claim 1, the method comprises:
sending, by the network entity, at least one resource to a UE, wherein the UE sends a transport block.

9. A network entity in a wireless network, the network entity comprising:
a memory;
a processor comprising processing circuitry; and
a logical channel controller, comprising controller circuitry and operably connected to the memory and the processor, configured to:
identify a Data Radio Bearer (DRB) associated with multiple logical channels;
identify a total Prioritized Bit Rate (PBR) value for the DRB;
determine a packet data convergence protocol (PDCP) distribution scheme; and
determine a PBR value for each logical channel of the multiple logical channels associated with the DRB based on the total PBR value for the DRB,
wherein the total PBR value for the DRB is distributed to each logical channel based on the PDCP distribution scheme, and
wherein the PDCP distribution scheme comprises at least one of a sequential distribution, a random distribution, a block distribution, a batch distribution, or an uplink split threshold-based distribution.

10. A method performed by a user equipment (UE) in a wireless network, the method comprising:
receiving, by the UE, information of resources from a network entity;
determining, by the UE, a packet data convergence protocol (PDCP) distribution scheme;
allocating, by the UE, the resources to logical channels associated with a data radio bearer (DRB) based on a prioritized bit rate (PBR) of each logical channel and the PDCP distribution scheme;
determining whether the PDCP distribution scheme is a sequential distribution;
based on determining that the PDCP distribution scheme is a sequential distribution, selecting a data protocol data unit (PDU) from each logical channel until a PBR limit is reached;
based on determining that the PDCP distribution scheme is not a sequential distribution, selecting the data PDU in batches from each logical channel until the PBR limit is reached; and
sending, by the UE, a plurality data packets comprising the selected data PDU based on resources allocated to the logical channels associated with the DRB,
wherein the PDCP distribution scheme comprises at least one of the sequential distribution, a random distribution, a block distribution, a batch distribution, or an uplink split threshold-based distribution.

11. The method as claimed in claim 10, further comprising:
detecting, by the UE, pending data PDU in at least one logical channel based on a strict decreasing priority order; and
allocating, by the UE, pending resources to the at least one logical channel until either the data PDU or an uplink (UL) grant is exhausted.

12. A User Equipment (UE) in a wireless network, the UE comprising:
a memory;
a processor comprising processing circuitry; and
a logical channel controller, comprising controller circuitry and operably connected to the memory and the processor, configured to:
receive, by the UE, information of resources from a network entity;
determine, by the UE, a packet data convergence protocol (PDCP) distribution scheme;
allocate, by the UE, the resources to logical channels associated with a data radio bearer (DRB) based on a Prioritized Bit Rate (PBR) of each logical channel and the PDCP distribution scheme;
determine whether the PDCP distribution scheme is a sequential distribution;
based on determining that the PDCP distribution scheme is a sequential distribution, selecting a data PDU from each logical channel until a PBR limit is reached;
based on determining that the PDCP distribution scheme is not a sequential distribution scheme, selecting the data PDU in batches from each logical channel until the PBR limit is reached; and
send, by the UE, a plurality of data packets comprising the selected data PDU based on resources allocated to the logical channels associated with the DRB,
wherein the PDCP distribution scheme comprises at least one of the sequential distribution, a random distribution, a block distribution, a batch distribution, or an uplink split threshold-based distribution.

13. The UE as claimed in claim 12, wherein the logical channel controller is further configured to:
detect, by the UE, pending data PDU in at least one logical channel based on a strict decreasing priority order; and
allocate, by the UE, pending resources to the at least one logical channel until either the data PDU or an uplink (UL) grant is exhausted.

* * * * *